(12) United States Patent
Matyas, Jr. et al.

(10) Patent No.: US 6,307,938 B1
(45) Date of Patent: Oct. 23, 2001

(54) METHOD, SYSTEM AND APPARATUS FOR GENERATING SELF-VALIDATING PRIME NUMBERS

(75) Inventors: Stephen M. Matyas, Jr., Manassas, VA (US); Allen Roginsky, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/114,024

(22) Filed: Jul. 10, 1998

(51) Int. Cl.$^7$ .................................................. H04L 9/30
(52) U.S. Cl. ........................................ 380/44; 380/46
(58) Field of Search .................................. 380/46, 44

(56) References Cited

U.S. PATENT DOCUMENTS 4,944,009 * 7/1990 Micali et al. ......................... 380/46
5,297,207 * 3/1994 Degele ................................. 380/46
5,647,000 * 7/1997 Leighton .............................. 380/30

* cited by examiner

*Primary Examiner*—Thomas R. Peeso
*Assistant Examiner*—Todd Jack
(74) *Attorney, Agent, or Firm*—Jeanine S. Ray-Yarletts

(57) ABSTRACT

A method, system and apparatus for generating primes (p and q) for use in cryptography from secret random numbers and an initialization value whereby the initial secret random numbers are encoded into the generated primes. This eliminates the need to retain the initial secret random numbers for auditing purposes. The initialization value may also be generated from information readily available, if so desired, resulting in additional entropy without the requirement of storing additional information.

23 Claims, 6 Drawing Sheets

FIG. 4

Table 1  *401*

| | |
|---|---|
| 0 | X'ab41eef5' |
| 1 | X'3646c9ab' |
| 2 | X'165ef3f1' |
| 3 | X'ebc71f39' |
| 4 | X'931693da' |
| 5 | X'8d73bbd0' |
| 6 | X'2202371c' |
| 7 | X'33f87ecd' |
| 8 | X'4f2d7c9c' |
| 9 | X'be8e7c9e' |
| 10 | X'41724428' |
| 11 | X'c95d52ef' |
| 12 | X'49104142' |
| 13 | X'db55bc74' |
| 14 | X'2fef9593' |
| 15 | X'eae66df8' |

Table 2  *402*

| | |
|---|---|
| 0 | X'ca991569' |
| 1 | X'7e209991' |
| 2 | X'd306D0df' |
| 3 | X'c4302a0c' |
| 4 | X'15e97589' |
| 5 | X'59f939d4' |
| 6 | X'ebca483e' |
| 7 | X'5d222488' |
| 8 | X'0c0bcc9d' |
| 9 | X'bab9161a' |
| 10 | X'4c4bc53d' |
| 11 | X'623ceb2e' |
| 12 | X'd240afc4' |
| 13 | X'0d9a3469' |
| 14 | X'01e97f47' |
| 15 | X'50f3fa17' |

Table 3  *403*

| | |
|---|---|
| 1 | X'cbcb2178fc268442' |
| 2 | X'339e4774c3d99e24' |
| 3 | X'1e8d7b4f21bd3153' |
| 4 | X'52223d056c372136' |
| 5 | X'7e16e105472f8f63' |
| 6 | X'1b9cb09f33316b8e' |
| 7 | X'039a3a8fa9434c8f' |

FIG. 6

Table 4  *601*

| | |
|---|---|
| 0 | X'e56c1be9' |
| 1 | X'9618f165' |
| 2 | X'2dde3628' |
| 3 | X'7137aad7' |
| 4 | X'd54f47f7' |
| 5 | X'85182766' |
| 6 | X'7c41c9d3' |
| 7 | X'60d5154b' |
| 8 | X'8916dd5e' |
| 9 | X'abdce6be' |
| 10 | X'8951aa92' |
| 11 | X'd7a5d673' |
| 12 | X'3b29ca80' |
| 13 | X'8cf18e8e' |
| 14 | X'6340d062' |
| 15 | X'17b6f1f2' |

Table 5  *602*

| | |
|---|---|
| 0 | X'5b2a6418' |
| 1 | X'e20221a8' |
| 2 | X'7a136915' |
| 3 | X'a8c95df6' |
| 4 | X'8eba0d1e' |
| 5 | X'282f21a5' |
| 6 | X'd8efdc93' |
| 7 | X'e76fb103' |
| 8 | X'aabd68b7' |
| 9 | X'2346f42d' |
| 10 | X'c0e5f419' |
| 11 | X'46936767' |
| 12 | X'dc194436' |
| 13 | X'b3ee8aca' |
| 14 | X'2888154f' |
| 15 | X'b48ac6d5' |

Table 6  *603*

| | |
|---|---|
| 1 | X'57c9f0d21604f786' |
| 2 | X'c23f364ea0eIf882' |
| 3 | X'631f4f44dd14b61d' |
| 4 | X'd3217562beae6b64' |
| 5 | X'62b8b59694afce5d' |
| 6 | X'2139d8f53dbd8436' |
| 7 | X'70c354445de1981d' |

METHOD, SYSTEM AND APPARATUS FOR GENERATING SELF-VALIDATING PRIME NUMBERS

RELATED INVENTIONS

Application Ser. No. 09/108,795 entitled Method, System and Apparatus for Improved Reliability in Generating Secret Keys filed on Jul. 2, 1998 and assigned to the assigned of the present invention.

BACKGROUND OF THE INVENTION

Cryptography is a security mechanism for protecting information from unintended disclosure by transforming the information into a form that is unreadable to humans, and unreadable to machines that are not specially adapted to reversing the transformation back to the original information content. The cryptographic transformation can be performed on data that is to be transmitted electronically, such as an electronic mail message, and is equally useful for data that is to be securely stored, such as the account records for customers of a bank or credit company.

In addition to preventing unintended disclosure, cryptography also provides a mechanism for preventing unauthorized alteration of data transmitted or stored in electronic form. After the data has been transformed cryptographically, an unauthorized person is unlikely to be able to determine how to alter the data, because the specific data portion of interest cannot be recognized. Even if the unauthorized user knew the position of the data portion within a data file or message, this position may have been changed by the transformation, preventing the unauthorized person from merely substituting data in place. If an alteration to the transformed data is made by the unauthorized user despite the foregoing difficulties, the fact of the alteration will be readily detectable, so that the data will be considered untrustworthy and not relied upon. This detection occurs when the transformation is reversed; the encrypted date will not reverse to its original contents properly if it has been altered. The same principle prevents unauthorized addition of characters to the data, and deletion of characters from the data, once it has been transformed.

The transformation process performed on the original data is referred to as "encryption." The process of reversing the transformation, to restore the original data, is referred to as "decryption." The terms "encipher" and "decipher" are also used to describe these processes, respectively. A mechanism that can both encipher and decipher is referred to as a "cipher." Data encryption systems are well known in the data processing art. In general, such systems operate by performing an encryption on a plaintext input block, using an encryption key, to produce a ciphertext output block. "Plaintext" refers to the fact that the data is in plain, unencrypted form. "Ciphertext" refers to the fact that the data is in enciphered or encrypted form. The receiver of an encrypted message performs a corresponding decryption operation, using a decryption key, to recover the original plaintext block.

A cipher to be used in a computer system can be implemented in hardware, in software, or in a combination of hardware and software. Hardware chips are available that implement various ciphers. Software algorithms are known in the art as well.

Encryption systems fall into two general categories. Symmetric (or secret key) encryption systems use the same secret key for both encrypting and decrypting messages. An example of a symmetric encryption system is the Data Encryption Standard (DES) system, which is a United States federal standard described in a National Institute of Standards and Technology Federal Information Processing Standard (FIPS Pub 46). In the DES system, a key having 56 independently specified bits is used to convert 64-bit plaintext blocks to 64-bit ciphertext blocks, or vice versa.

Asymmetric (or public key) encryption systems, on the other hand, use two different keys that are not feasibly derivable from one another, one for encryption and another for decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, since only he has the private key. One of the best-known asymmetric encryption systems is the RSA encryption system, named for its originators Rivest, Shamir, and Adleman, and described in U.S. Pat. No. 4,405,829 to Rivest et al., "Cryptographic Communications System and Method."

A public key system is frequently used to encrypt and transmit secret keys for use with a secret key system. A public key system is also used to provide for digital signatures, in which the sender encrypts a signature message using his private key. Because the signature message can only be decrypted with the sender's public key, the recipient can use the sender's public key to confirm that the signature message originated with the sender.

A commonplace method, for both signature generation and signature verification, is to reduce the message M (to be signed) by means of a cryptographic hash function, in which case, the hash of the message, H(M), is signed instead of the message M itself. Signing H(M) requires only one encryption operation whereas M may require several encryption operations, depending on the length of M.

A method for computing digital signatures (e.g., with the RSA algorithm) is described in ANSI Standard X9.31-1998 Digital Signatures Using Reversible Public Key Cryptography For The Financial Services Industry (rDSA). ANSI Standard X9.31 defines procedures for 1. Choosing the public verification exponent, e,
2. Generating the private prime factors, p and q, and public modulus, n=pq, and
3. Calculating the private signature exponent, d.

The procedure for signing a message M (signature production) consists of the following steps: M is hashed using a cryptographic hash function H to produce a hash value H(M). H(M) is then encapsulated within a data structure IR, a representative element RR is computed from IR, and RR is raised to the power d modulo n. The signature $\Sigma$ is either the result or its complement to n, whichever is smaller. That is, $\Sigma = \min\{RR^d \bmod n, n-(RR^d \bmod n)\}$. The signature $\Sigma$ is exactly one bit less in length than the length of the modulus n. The message and signature (M, $\Sigma$) are then sent to the receiver for verification.

The procedure for verifying a signature (signature verification) consists of the following steps: The verifier treats the message and signature as (M', $\Sigma$') until the signature verification is successful, and it is proven that M=M' and $\Sigma=\Sigma'$. The signature $\Sigma'$ is raised to the power e mod n in order to obtain the intermediate integer RR'. That is, RR'= $(\Sigma')^e \bmod n$. The intermediate integer IR' is then computed from RR' as a function of the least significant (right most) bits of RR'. A sanity check is then performed on IR', and if this step succeeds, the value of H(M)' is then recovered from IR'. Finally, a hash is computed on the message M', and the computed value of H(M') is compared for equality with the recovered value of H(M)'. The verification process succeeds if the two values are equal and it fails if the two values are not equal.

The public exponent is a positive integer e, where $2 \leq e \leq 2^{k-160}$, and k is the length of the modulus n in bits. The public exponent may be selected as a fixed value or generated as a random value. When e is odd, the digital signature algorithm is called RSA. When e is even, the digital signature algorithm is called Rabin-Williams. Common fixed values for e are 2, 3, 17, and $2^{16}+1=65,537$.

The public modulus, n, is the product of two distinct positive primes, p and q (i.e., n=pq).

The private prime factors, p and q, are secretly and randomly selected by each signing entity. The private prime factors must satisfy several conditions, as follows:

1. Constraints on p and q relative to e are:
    If e is odd, then e shall be relatively prime to both p−1 and q−1.
    If e is even, then p shall be congruent to 3 mod 8, q shall be congruent to 7 mod 8, and e shall be relatively prime to both (p−1)/2 and (q−1)/2.
2. The numbers p±1 and q±1 shall have large prime factors greater than $2^{100}$ and less then $2^{120}$, such that:
    p−1 has a prime factor denoted by $p_1$
    p+1 has a prime factor denoted by $p_2$
    q−1 has a prime factor denoted by $q_1$
    q+1 has a prime factor denoted by $q_2$
3. The private prime factor p is the first discovered prime greater than a random number $X_p$, where $(\sqrt{2})(2^{511+128s}) \leq X_p \leq (2^{512+128s}-1)$, and meets the criteria in Nos. 1 and 2 above, and the private prime factor q is the first discovered prime greater than a random number $X_q$, where $(\sqrt{2})(2^{511+128s}) \leq X_q \leq (2^{512+128s}-1)$, and meets the criteria in Nos. 1 and 2 above. s=0, 1, 2, etc. is an integer used to fix the block size. Once selected, the value of s remains constant for the duration of the prime generation procedure.
4. The random numbers $X_p$ and $X_q$ must be different by at least one of their first most significant 100 bits, i.e., $|X_p - X_q| > 2^{412+128s}$. For example, if s=4, so that $X_p$ and $X_q$ are 1024-bit random numbers, then the most significant bit of $X_p$ and the most significant bit of $X_q$ must be "1" and the next most significant 99 bits of $X_p$ and the next most significant 99 bits of $X_q$ must be different in at least 1 bit. Likewise, the private prime factors, p and q, must also satisfy the relationship $|p-q| > 2^{412+128s}$.

The private signature exponent, d, is a positive integer such that $d > 2^{512+128s}$. That is, the length of d must be at least half the length of the modulus n. d is calculated as follows:
    If e is odd, then $d = e^{-1} \mod (\text{LCM}(p-1, q-1))$
    If e is even, then $d = e^{-1} \mod (\frac{1}{2} \text{LCM}(p-1, q-1))$
        where LCM denotes "Least Common Multiple." In the rare event that $d \leq 2^{512+128s}$, then the key generation process is repeated with new seeds for $X_{q1}$, $X_{q2}$, and $X_q$. The random numbers $X_{q1}$ and $X_{q2}$ are defined below.

The candidates for the private prime factors, p and q, are constructed using the large prime factors, $p_1$, $p_2$, $q_1$, and $q_2$, and the Chinese Remainder Theorem (see A. Menezes, P. C. Van Oorschot, and S. Vanstone, Handbook of Applied Cryptography, CRC Press, 1997.)

The large prime factors $p_1$, $p_2$, $q_1$, and $q_2$, are generated from four generated random numbers $X_{p1}$, $X_{p2}$, $X_{q1}$ and $X_{q2}$.

The random numbers are chosen from an interval $[2^{100+a}, 2^{101+a}-1]$ where "a" satisfies $0 \leq a \leq 20$. For example, if a=19, then the random numbers are randomly selected from the interval $[2^{119}, 2^{120}-1]$, in which case the random numbers each have 120 bits, where the most significant bit of each generated number $X_{p1}$, $X_{p2}$, $X_{q1}$ and $X_{q2}$ is "1." If a pseudo random number generator (PRNG) is used, it is recommended that the four random numbers should be generated from 4 separate input seeds.

The $p_1$, $p_2$, $q_1$, and $q_2$, are the first primes greater than their respective random X values ($X_{p1}$, $X_{p2}$, $X_{q1}$ and $X_{q2}$) and such that they are mutually prime with the public exponent e. That is, e must not contain a factor equal to $p_1$, $p_2$, $q_1$, or $q_2$.

The procedure to generate the private prime factor p is as follows:
    A. Select a value of s, e.g., s=4.
    B. Generate a random number $X_p$ such that ($\sqrt{+e}$,fra +ee 2) $(2^{511+128s}) \leq X_p \leq (2^{512+128s}-1)$.
    C. Compute the intermediate values:
        $R_p = (p_2^{-1} \mod p_1)p_2 - (p_1^{-1} \mod p_2)p_1$. If $R_p < 0$, then replace $R_p$ by $R_p + p_1 p_2$.
        $Y_0 = X_p + (R_p - X_p \mod p_1 p_2)$.
    If e is odd, do the following:
    1. If $Y_0 < X_p$, replace $Y_0$ by $(Y_0 + p_1 p_2)$. $Y_0$ is the least positive integer greater than $X_p$ congruent to $(1 \mod p_1)$ and $(-1 \mod p_2)$. This ensures that $p_1$ is a large prime factor of $(Y_0 - 1)$ and $p_2$ is a large prime factor of $(Y_0 + 1)$.
    2. Search the integer sequence $\{Y_0, Y_1 = Y_0 + (p_1 p_2), Y_2 = Y_0 + 2(p_1 p_2), Y_3 = Y_0 + 3(p_1 p_2), \ldots, Y_i = Y_0 + i(p_1 p_2)\}$ in order, where i is an integer $\geq 0$, until finding a $Y_i$ such that
    $Y_i$ is prime and
    GCD $(Y_i - 1, e) = 1$
        where GCD is Greatest Common Divisor, in which case, $p = Y_i$.
    If e is even, do the following:
    1. Replace $Y_0$ with $Y_0 + k p_1 p_2$, where $0 \leq k \leq 7$ is the smallest non-negative integer that makes $Y_0 + k p_1 p_2 \equiv 3 \mod 8$. If $Y_0 < X_p$, replace $Y_0$ by $(Y_0 + 8 p_1 p_2)$. $Y_0$ is the least positive integer greater than $X_p$ congruent to $(1 \mod p_1)$ and $(-1 \mod p_2)$ and $(3 \mod 8)$.
    2. Search the integer sequence.

$\{Y_0, Y_1 = Y_0 + (8 p_1 p_2), Y_2 = Y_0 + 2(8 p_1 p_2), Y_3 = Y_0 + 3(8 p_1 p_2), \ldots, Y_i = Y_0 + i(8 p_1 p_2)\}$ in order, where i is an integer $\geq 0$, until finding a $Y_i$ such that
    $Y_i$ is prime and
    GCD $((Y_i - 1)/2, e) = 1$, and $Y_i \equiv 3 \mod 8$
        in which case, $p = Y_i$.
    The procedure to generate the private prime factor q is as follows:
    A. The s used to generate q is the same s used to generate p, e.g., s=4.
    B. Generate a random number $X_q$ such that $(\sqrt{2})(2^{511+128s}) \leq X_q \leq (2^{512+128s}-1)$.
    C. Compute the intermediate values:
        $R_q = (q_2^{-1} \mod q_1)q_2 - (q_1^{-1} \mod q_2)q_1$. If $R_q < 0$, then replace $R_q$ by $R_q + q_1 q_2$.
        $Y_0 = X_q + (R_q - X_q \mod q_1 q_2)$.

If e is odd, do the following:
1. If $Y_0 < X_q$, replace $Y_0$ by $(Y_0+q_1q_2)$. $Y_0$ is the least positive integer greater than $X_q$ congruent to (1 mod $q_1$) and (−1 mod $q_2$). This ensures that $q_1$ is a large prime factor of $(Y_0-1)$ and $q_2$ is a large prime factor of $(Y_0+1)$.
2. Search the integer sequence $$\{Y_0, Y_1=Y_0+(q_1q_2), Y_2=Y_0+2(q_1q_2), Y_3=Y_0+3(q_1q_2), \ldots, Y_i=Y_0+i(q_1q_2)\}$$

in order, where i is an integer $\geq 0$, until finding a $Y_i$ such that
  $Y_i$ is prime and
  GCD $(Y_i-1, e)=1$
  in which case, $q=Y_i$.

If e is even, do the following:
1. Replace $Y_0$ with $Y_0+kq_1q_2$, where $0 \leq k \leq 7$ is the smallest non-negative integer that makes $Y_0+kq_1q_2 \equiv 7$ mod 8. If $Y_0 < X_p$, replace $Y_0$ by $(Y_0+8p_1p_2)$. $Y_0$ is the least positive integer greater than $X_q$ congruent to (1 mod $q_1$) and (−1 mod $q_2$) and (7 mod 8).
2. Search the integer sequence.

$$\{Y_0, Y_1=Y_0+(8q_1q_2), Y_2=Y_0+2(8q_1q_2), Y_3=Y_0+3(8q_1q_2), \ldots, Y_i=Y_0+i(8q_1q_2)\}$$

in order, where i is an integer $\geq 0$, until finding a $Y_i$ such that
  $Y_i$ is prime and
  GCD $((Y_i-1)/2, e)=1$, and $Y_i \equiv 7$ mod 8
  in which case, $q=Y_i$.

As mentioned above, the value $|X_p-X_q|$ must be $>2^{412+128s}$. If not, then another $X_q$ is generated, and a new value of q is computed. This step is repeated until the constraint is satisfied. Likewise, the generated values of p and q must satisfy the relation $|p-q|>2^{412+128s}$.

Note that it is very unlikely that the test on $|X_p-X_q|$ would succeed and the test on $|p-q|$ would fail. Note also that according to the X9.31 Standard, if a pseudo random number generator is used to generate random numbers, then separate seeds should be used to generate $X_p$ and $X_q$.

Altogether there are six random numbers $X_i$ needed in the generation of the private prime factors, p and q, namely $X_p$, $X_{p1}$, $X_{p2}$, $X_q$, $X_{q1}$ and $X_{q2}$. These random numbers are generated by either a true noise hardware randomizer (RNG) or via a pseudo random generator (PRNG).

The random numbers $X_i$ are generated differently depending on whether or not the process of generating the private prime factors (p and q) requires the capability to be audited later by an independent third party.

In the case where no audit is required, the outputs of the RNG and the PRNG are used directly as the random numbers $X_i$. In the case where audit is required, the outputs of the RNG and the PRNG are used as intermediate values, called SEED (upper case) values, and these SEED values are then hashed to produce the random numbers $X_i$. That is, when an audit capability is required, an extra hashing step is used in the generation of the random numbers $X_i$.

The PRNG itself makes use of an input seed (lower case), which is different from the generated SEED values. Thus, when an audit capability is required and a PRNG is used, a random seed (lower case) is input to the PRNG and a SEED (upper case) is output from the PRNG. The SEEDs should have at least 160 bits of entropy.

To illustrate the process, suppose that one wishes to generate a 1024 bit random number $X_i$ using SHA-1 as the hash algorithm—see ANSI Standard X9.30-1996, Public Key Cryptography Using Irreversible Algorithms for the Financial Services Industry, Part 2: The Secure Hash Algorithm-1 (SHA-1). Since the output hash value from SHA-1 is 160 bits, the optimal method for generating an $X_i$ of 1024 bits is to generate 7 160-bit SEED values, denoted SEED1 through SEED7, hash each of these SEED values with SHA-1 to produce 7 corresponding 160-bit hash values, denoted hash1 through hash7, and then extract 1024 bits from the available 1120 bits, e.g., by concatenating the values hash1 through hash6 together with 64 bits taken from hash7. The method for generating a 120-bit $X_i$ is more straightforward. In this case, a single 160-bit SEED is generated and then hashed, and 120 bits are taken from the resulting hash value. The concatenation of the 7 SEED values used in generating each of $X_p$ and $X_q$ are denoted $X_p$SEED and $X_q$SEED, respectively. The single SEED values used in generating $X_{p1}$, $X_{p2}$, $X_{q1}$ and $X_{q2}$ are denoted $X_{p1}$SEED, $X_{p2}$SEED, $X_{q1}$SEED, and $X_{q2}$SEED, respectively.

In order to allow for audit, the SEED values $X_p$SEED, $X_q$SEED, $X_{p1}$SEED, $X_{p2}$SEED, $X_{q1}$SEED, and $X_{q2}$SEED must be saved, and they must be available in case an audit is required.. The SEED values must also be kept secret. It is recommended that the SEED values ($X_p$SEED, $X_q$SEED, $X_{p1}$SEED, $X_{p2}$SEED, $X_{q1}$SEED, and $X_{q2}$SEED) be retained with the private key as evidence that the primes were generated in an arbitrary manner.

The procedure for auditing the generation procedure (i.e., the generation of the private prime factors, p and q) is a follows:
1. The inputs to the audit procedure are the public exponent e, the public modulus n, and the six secret SEED values $X_p$SEED, $X_q$SEED, $X_{p1}$SEED, $X_{p2}$SEED, $X_{q1}$SEED, and $X_{q2}$SEED.
2. The SEED values $X_p$SEED, $X_q$SEED, $X_{p1}$SEED, $X_{p2}$SEED, $X_{q1}$SEED, and $X_{q2}$SEED are hashed, and the random number $X_p$, $X_q$, $X_{p1}$, $X_{p2}$, $X_{q1}$ and $X_{q2}$, are produced from the generated hash values, respectively, using the same procedure that was used to generate the private prime factors, p and q.
3. The private prime factors, p and q, and the private signature exponent d are re-generated using the same procedure used originally to generate p, q, and d.
4. The generated p and q are multiplied together and the resulting product is compared for equality with the input modulus n. If the two values are equal, then the prime factors were generated according to the rules prescribed in the ANSI X9.31 Standard. Otherwise, the prime factors were not generated according to the rules prescribed in the ANSI X9.31 Standard.

The audit procedure is specifically designed to defend against a so-called First Party Attack. In a first party attack, a user purposely generates a large number of candidate prime numbers until one is found that has some mathematical weakness. Later, the user repudiates one or more of his generated signatures by showing that a weakness exists in one of his primes and claiming that the weakness was discovered and exploited by an adversary. In such a case, the user (or First Party) does not follow the prescribed ANSI X9.31 private prime factor generation procedure, but instead uses a different method to purposely construct primes that have a desired weakness But, the ANSI X9.31 method of prime number generation—hashing SEED values to generate the needed random numbers, $X_i$—prevents an insider from starting with an intentionally constructed "bad prime" and working backwards to derive the SEED(s) needed to generate the prime. Whereas, it might be possible to start with a constructed "bad prime" and invert the steps to obtain the corresponding random number $X_i$ (needed to produce the "bad prime"), it is not possible to invert the hash function to determine the required input SEED(s) that will produce $X_i$. In effect, the method of using hash values forces the user to generate his primes using a "forward process." This means that the only way a "bad prime" can be produced is by pure chance—by repeatedly selecting different starting SEED values and generating primes from these SEED values until a "bad prime" happens to be produced. However, the probability of such a chance event is very small, in fact small enough so that (for practical purposes) a user will never be able to find a "bad prime" using trial and error.

The procedure for generating the private prime factors (p and q) and the private signature exponent d can be specified in terms of the following abbreviated steps:

1. Generate $X_{p1}$SEED, and then generate $X_{p1}$ from $X_{p1}$SEED. This is a constructive step that cannot fail.
2. Generate p1 from $X_{p1}$. This step is an iterative step in which candidate values of $p_1$ are generated from a single starting value $X_{p1}$, in a prescribed order, until a $p_1$ is found that satisfies a required primality test and a test involving the public verification exponent e. The step can potentially fail in the very unlikely event that the size of the generated $p_1$ (e.g., 121 bits) is greater than the size of the starting value $X_{p1}$ (e.g., 120 bits). If step 2 fails, then repeat steps 1 and 2; otherwise, continue with step 3.
3. Generate $X_{p2}$SEED, and then generate $X_{p2}$ from $X_{p2}$SEED. This is a constructive step that cannot fail.
4. Generate $p_2$ from $X_{p2}$. This step is an iterative step in which candidate values of $p_2$ are generated from a single starting value $X_{p2}$, in a prescribed order, until a $p_2$ is found that satisfies a required primality test and a test involving the public verification exponent e. The step can potentially fail in the very unlikely event that the size of the generated $p_2$ (e.g., 121 bits) is greater than the size of the starting value $X_{p2}$ (e.g., 120 bits). If step 4 fails, then repeat steps 3 and 4; otherwise, continue with step 5.
5. Generate $X_p$SEED (e.g., consisting of 7 160-bit SEEDs), and then generate $X_p$ from $X_p$SEED. This step involves a test to ensure that $X_p$ falls within a specified range of allowed values. The step is repeated (possibly several times) until a suitable value of $X_p$ is found.
6. Generate p from $X_p$. This step is an iterative step in which candidate values of p are generated from a single starting value $X_p$, in a prescribed order, until a p is found that satisfies a required primality test and a test involving the public verification exponent e. The step can potentially fail in the extremely unlike event that the size of the generated p (e.g., 1025 bits) is greater than the size of the starting value $X_p$ (e.g., 1024 bits). If step 6 fails, then repeat steps 5 and 6; otherwise, continue with step 7
7. Generate $X_{q1}$SEED, and then generate $X_{q1}$ from $X_{q1}$SEED. This is a constructive step that cannot fail.
8. Generate $q_1$ from $X_{q1}$. This step is an iterative step in which candidate values of $q_1$ are generated from a single starting value $X_{q1}$, in a prescribed order, until a $q_1$ is found that satisfies a required primality test and a test involving the public verification exponent e. The step can potentially fail in the very unlikely event that the size of the generated $q_1$ (e.g., 121 bits) is greater than the size of the starting value $X_{q1}$ (e.g., 120 bits). If step 8 fails, then repeat steps 7 and 8; otherwise, continue with step 9.
9. Generate $X_{q2}$SEED, and then generate $X_{q2}$ from $X_{q2}$SEED. This is a constructive step that cannot fail.
10. Generate $q_2$ from $X_{q2}$. This step is an iterative step in which candidate values of $q_2$ are generated from a single starting value $X_{q2}$, in a prescribed order, until a $q_2$ is found that satisfies a required primality test and a test involving the public verification exponent e. The step can potentially fail in the very unlikely event that the size of the generated $q_2$ (e.g., 121 bits) is greater than the size of the starting value $X_{q2}$ (e.g., 120 bits). If step 10 fails, then repeat steps 9 and 10; otherwise, continue with step 11.
11. Generate $X_q$SEED (e.g., consisting of 7 160-bit SEEDs), and then generate $X_q$ from $X_q$SEED. This step involves a test to ensure that $X_q$ falls within a specified range of allowed values and that $|X_p-X_q|$ is greater than a specified value. The step is repeated (possibly several times) until a suitable value of $X_q$ is found.
12. Generate q from $X_q$. This step is an iterative step in which candidate values of q are generated from a single starting value $X_q$, in a prescribed order, until a q is found that satisfies a required primality test and a test involving the public verification exponent e and a test to ensure that $|p-q|$ is greater than a value. The step can potentially fail in the extremely unlikely event that the size of the generated q (e.g., 1025 bits) is greater than the size of the starting value $X_q$ (e.g., 1024 bits). If step 12 fails, then repeat steps 11 and 12; otherwise, continue with step 13.
13. Generate the private signature exponent d from e, p and q. Then test d to ensure that it is smaller than a specified value. In the extremely rare event that the test on d fails, repeat steps 7 through 13; otherwise stop.

The ANSI X9.31 prescribed audit procedure has certain disadvantages.

1. For a modulus with 1024-bit primes, approximately 2880 bits of extra SEED values ($X_p$SEED, $X_q$SEED, $X_{p1}$SEED, $X_{p2}$SEED, $X_{q1}$SEED, and $X_{q2}$SEED) would need to be carried with each private key. This more than triples the number of secret bits that need to be carried in the "private key."
2. Although the ANSI X9.31 Standard recommends that the SEED values be retained with the private key, some implementers may object to this (e.g., when the key is stored on a smart card or when the key is input to a cryptographic function or cryptographic hardware to perform a cryptographic operation), and they may elect to retain the SEED values separately from the private key. But keeping the SEED values separate from the private key has even worse ramifications. In that case, the SEED values may become lost or damaged, in which case the audit function is crippled or rendered ineffective, and most likely the signature key is also rendered ineffective. The user must also protect the secrecy of the of the SEED values, since if the SEED values are discovered by an adversary, they can be easily used to generate the primes and private key, and hence to forge signatures. Storing the private key and SEED values in two different locations means that there are now two targets or points of attack for the adversary, not just one. Thus, when the audit feature is used, the honest user must take extra special steps to the SEEDs from becoming lost or damaged and to protect the secrecy of the SEEDs. This places an extra burden on the user.

3. The SEED values are independent, and there is no apparent need for this. Consequently, it might be possible for an insider attacker to exploit this degree of independence to attack the procedure.

Accordingly, a need exists for an improved and more flexible audit procedure that retains the advantages of the present ANSI X9.31 audit procedure, but eliminates its disadvantages. More particularly, a need exists for an audit procedure that does not require secret SEED values to be retained with the private key and made available whenever the audit procedure is required to be performed. In addition, a need exists for a private prime factor generation procedure that incorporates fewer degrees of freedom in the selection of random numbers required by the procedure, while at the same time providing sufficient entropy in the generated random numbers, thereby providing a strong generation procedure while at the same time affording an adversary less freedom to exploit and potentially attack the generation procedure.

The present invention achieves these objectives by encoding the initial secret seed values into the generated primes themselves. An optional nonsecret initialization value (IV) can also be specified to the generation procedure. This provides an additional source of entropy for the generation of the primes. For example, if two 1024-bit primes (p and q) are generated, then the method of the invention permits seed values with a combined entropy of 2048 bits to be used to generate these primes.

One of the inherent limitations of the generation procedure is that it is not possible to construct n-bit primes with n bits of entropy, where the seeds used to generated these primes are encoded wholly into the generated primes. Thus, a must choose whether to (1) generate n-bit primes using less than n bits of entropy, in order that the seeds can be encoded into the generated primes, or (2) generate n-bit primes using a full n bits of entropy, thus implying the need for a initialization value (IV) that must be retained or regenerated in case of audit. It is, therefore, desirable to find a convenient method for implementing an IV.

The generation procedure can be audited using only the generated cryptographic variables (n=pq, d, and e) and the optional IV, where n is the public modulus, d is the generated private signature exponent, e is the public verification exponent and IV is the (optional) initialization value. It is unnecessary for the user to retain the primes (p and q), since an efficient procedure exists to compute these primes from n, d, and e.

OBJECTS OF THE INVENTION

It is an object of the present invention to provide a method for generating primes such that the secret seed values used in generating the primes are encoded in the generated primes themselves. Moreover, it is an object of the invention to provide an encoding method that permits the secret seed values to be recovered from the primes, in case of audit, thus allowing the primes to be validated by demonstrating that the primes can be re-generated from the recovered secret seed values.

It is yet another object of the invention to provide a method for encoding the secret seed values into the generated primes that maximizes the amount of secret entropy that can be encoded into the generated primes.

It is yet another object of the invention to provide a method for generating primes that permits n bits of entropy to be specified in the generation of an n-bit prime. Moreover, it is an object of the invention that the total entropy used in the generation of an n-bit prime shall consist (minimally) of a first component consisting of secret entropy and a second component consisting of nonsecret or secret entropy. The first component represents the entropy (i.e., secret seeds) encoded into the generated primes; the second component represents the entropy supplied via an initialization value (IV), and is not encoded into the generated primes.

It is yet another object of the invention to provide a procedural method for generating a random IV from information readily available or accessible to the user, in such a way that the user does not need to save or store any extra information in order to later regenerate the IV in case it is necessary to validate the primes because of an audit.

It is yet another object of the invention to provide a prime generation procedure with a general interface such that the user has several options for specifying the initialization value (IV), including any of the following: (1) no IV, (2) a known constant, (3) a public random number, (4) a secret constant, and (5) a secret random number.

It is yet another object of the invention to provide a method to encode information into the generated primes whereby there is no bias introduced by the encoding method, per se, into any bits of the generated primes, excluding any such bias introduced into the primes as a consequence of the procedure for generating the primes, which would otherwise be introduced into the primes if there were no additional encoding of information into the generated primes.

It is yet another object of the invention to provide a method for encoding information into the generated primes that is compatible with the method for generating prime numbers, as described in ANSI Standard X9.31. It is yet another object of the invention to provide a method for auditing the procedure for generating the private prime factors which is an improvement on the auditing method prescribed in ANSI Standard X9.31.

SUMMARY OF INVENTION

These and other objects, features, and advantages are accomplished by the invention disclosed herein. Several embodiments of the invention are provided for educational purposes although none are meant to limit or restrict the scope of the present invention.

The present invention relates to cryptography, and deals more particularly with a method for the generation of prime numbers used in public key cryptography, such as the generation of an RSA public modulus (n) which is the product of two large primes (p and q). The primes are generated from seed values in such a way that the primes are self-validating. That is, given a pair of primes (p and q), where n=pq, one can work backwards to determine the original seed value used to generate the primes, and then work forwards to verify that the primes were indeed generated according to the prescribed generation algorithm.

The present invention describes a method, system and apparatus for enabling an independent third party to verify that the primes generated for use with a reversible public key cryptographic algorithm, such as the RSA or Rabin-Williams public key algorithms, have been generated correctly and in accordance with the prescribed generation procedure, hereinafter referred to as the Modified Prime Number Generation Procedure or Generation Procedure for short. The Modified Prime Number Generation Procedure is a combination of procedural steps prescribed in ANSI Standard X9.31 and new procedural steps prescribed by the present invention, which replace certain procedural steps prescribed in ANSI Standard X9.31. This distinction is made clear by the description of the invention.

As such, the present invention describes a method for generating two 1024-bit (128-bytes) primes (p and q) from two 95-byte secret random numbers, $W_p$ and $W_q$, and a 66-byte secret or nonsecret Initialization Value (IV). In the preferred embodiment of the invention, the IV is a 66-byte nonsecret value generated via a fixed procedure using information readily available or accessible to the user. However, the invention can be practiced in any of the situations, including (1) no IV, (2) the IV is a known constant, (3) the IV is a public random number, (4) the IV is a secret constant, and (5) the IV is a secret random number. $W_p$, $W_q$, and IV are the initial or starting values specified to the generation procedure. The public verification exponent e is also used by the generation procedure, but it is not referred to as a seed value in the present invention. One may think of these as seed values, since all other random numbers needed by the generation procedure are generated or derived from these three values and e. It is also possible, if deemed more convenient, to define one 190-byte secret seed value W, where W is the concatenation of $W_p$ and $W_q$, i.e., $W=W_p\|W_q$. In the present invention, both W and IV contribute to the generation of the two primes (p and q), but only W is encoded into the generated primes. IV and e must be provided to the validation procedure in case of an audit, whereas W can be recovered from the generated primes themselves.

Those skilled in the art will recognize and appreciate that the invention could easily be extended to allow the generation of primes of different sizes, by adjusting the sizes of $W_p$, $W_q$, and IV, and by adjusting the sizes of the intermediate values computed by the generation procedure, as defined by the invention.

The present invention is such that given the public modulus n and the public and private exponents (e and d), where e is the public verification exponent and d is the private signature exponent, and n is the product of primes p and q (n=pq), one can easily recover the primes (p and q) from n, d, and e, using an efficient procedure well-known in the art (see Section 8.2.2 of A. J. Menezes' *Handbook of Applied Cryptography*, CRC Press, New York, 1997). Then, using p and q and IV, one can recover the original, initial values of $W_p$ and $W_q$, using the method of the invention.

Once $W_p$ and $W_q$ have been recovered, the Generation Procedure is again performed with $W_p$, $W_q$, IV and e to generate candidate values of p and q. If the generated primes are equal in value to the recovered primes, then the validation procedure succeeds, and one can say that the recovered primes were generated in accordance with the prescribed Generation Procedure; otherwise, the validation procedure fails.

The present invention has the desirable property that the initial secret random numbers, $W_p$ and $W_q$, are encoded into the generated primes, p and q, and therefore it is unnecessary to retain these secret random numbers with the private key. In the preferred embodiment of the invention, the nonsecret IV can be regenerated from information already available to the user, in which case it is unnecessary for the IV to be stored outside, or carried as an extra cryptographic variable. Thus, the invention has the benefit of additional entropy without paying a penalty for storing the IV. For practical purposes, the generated primes are self-validating, which means that the primes can be validated merely on the basis of the information contained within the primes and information that can be easily computed and supplied to the algorithm, without the need for storing this information outside the generated primes.

The present invention has the desirable property that a user, who in some cases may be a first party attacker, is unable to select an arbitrary prime, p or q, and then "work backwards" to find values for $W_p$ and $W_q$ that would produce the selected values of p or q. That is, one cannot first select the primes and then work backwards to determine the initial seeds that will produce these selected primes. This property of the invention protects against a first party attack in which the attacker purposely selects a "bad prime" and then works backwards to determine the seed or seeds that would produce the prime. In the preferred embodiment of the present invention $W_p$ and $W_q$ are each 95-byte secret random numbers, and each contains 95 bytes of secret entropy. In the preferred embodiment, IV contains 66 bytes of nonsecret entropy. Altogether, the generated primes have 190 bytes of secret entropy and 66 bytes of nonsecret entropy. Each generated prime is a complex function of $W_p$, $W_q$ and IV, thus ensuring that it would be much more difficult to determine the value of one of the primes by making repeated guesses for $W_p$ and $W_q$ (IV is assumed available to the attacker) and then using the method of the invention to generate values of p and q, than it would to guess the value of one of the primes (say p) and then compute GCD(n, p) to determine whether the guessed value of p is indeed a factor of n. The 190 bytes of secret entropy in $W_p$ and $W_q$ would seem to be more than sufficient, since once the modulus n=pq is revealed, a knowledge of p will allow n to be factored, revealing q, and vice versa. Hence, it appears that once n is known, there are only 128 bytes of effective secret entropy remaining in p and q.

BRIEF DESCRIPTION OF THE DRAWINGS

FIG. 4 is an example of the masking tables used in prime generation.

FIG. 6 represents exemplary masking tables.

DETAILED DESCRIPTION OF THE PREFERRED EMBODIMENTS

Figure 1:
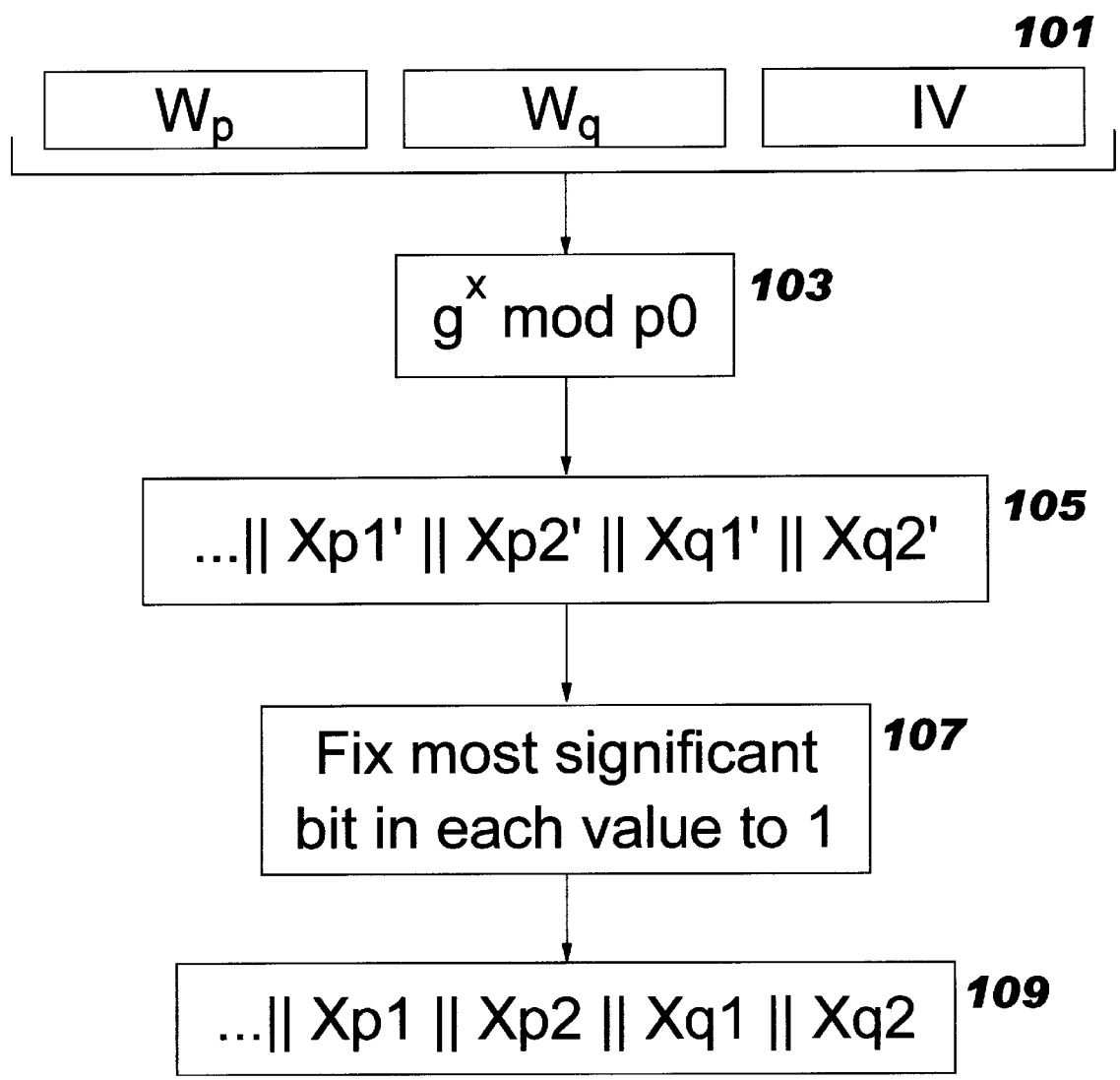
FIG. 1 graphically represents an exemplary method for computing random seeds.

The modified prime number generation procedure consists of 6 steps, as follows:

1. Generation of Random Numbers $X_{p1}$, $X_{p2}$, $X_{q1}$, and $X_{q2}$.
2. Generation of Random Number $X_p$.
3. Generation of Prime p.
4. Generation of Random Number $X_q$.
5. Generation of Prime q.
6. Generation of Private Signature Exponent d.

In the present invention, p is generated from the input random numbers, $W_p$, $W_q$, IV, and the public verification exponent e, whereas q is generated from p, $W_q$, IV, and e, i.e., from the generated p and the input random numbers $W_q$, IV, and e. Thus, the procedures for generating p and q are not identical, and in fact p must be generated first, before q can be generated. Consequently, the procedures for recovering $W_p$ and $W_q$ are not identical. $W_q$ is recovered from p, q, and IV, whereas $W_p$ is recovered from p, $W_q$ and IV. Thus, $W_q$ must be recovered first, before $W_p$ can be recovered. However, unlike the generation procedure where $W_p$ and $W_q$ are specified, and hence there is no ambiguity over which of these values is $W_p$ and which is $W_q$, the validation procedure has no way to know which of the two prime factors of the modulus n=pq is p or which is q. One means for handling this is to carry an extra bit of information in the public key certificate to indicate whether p>q or p<q. In that case, this information is specified to the validation procedure, thus allowing the validation procedure to make an unambiguous assignment of p and q. Another approach for handling this problem is to make an arbitrary assignment of p and q and see if this leads to a successful validation. If not, then the assigned values of p and q are switched and the validation procedure is repeated. If one of the assignments of p and q leads to a successful validation, then the validation procedure succeeds; otherwise it fails. Also, the validation procedure can be performed as an integral part of generation, to ensure that the generated p and q validate properly. Thus, one could ensure that one and only one of the assignments of p and q leads to a successful validation.

In the preferred embodiment of the invention, the initialization value (IV) is a nonsecret random number that can be generated or regenerated, on demand, by the user from information available or easily accessible to the user. This means that the user does not need to retain the IV, or carry it as an extra cryptographic variable in case of an audit. Those skilled in the art will appreciate that there are many possible ways in which such a nonsecret IV could be generated or regenerated, using some fixed procedure that makes use only of information known to or easily accessible to the user.

One method would be to make use of a public key algorithm, such as the RSA algorithm, where the public modulus n and public exponent e are generated by an entity, such as a Certification Authority (CA), e.g., the CA who creates the user's certificate, or published in a national or international cryptographic standard. Let n denote a public modulus of length L bits, where L is greater than the length of the generated IV. For example, an n of 2048 bits would be sufficient to generate a 66-byte IV, where IV is defined as the least significant 66 bytes of the generated 256-byte value y, $$y = s^e \bmod n,$$

and s is an input seed value specified by the user (s<n).

In many cases, users are likely to generate only relatively few public and private key pairs. Under such circumstances, the seed s could be defined as follows:

$$s = (\text{ID of CA} \| \text{ID of user} \| \text{certificate expiration date})$$

The "ID of CA" and "ID of user" and "certificate expiration date" denote information that the user should know, or be able to acquire, even in advance of the actual creation of the certificate. Other information in the certificate might also be used to create s, provided that the method for creating s is fixed, and the information needed to create s is available or easily accessible to the user, at the time of generation and later in case of an audit. In that case, the conditions on s described by the method of the invention will be satisfied. The seed s might also include a certificate creation date or a certificate activation date or a certificate number, or other public information uniquely identifying the user and the generated public and private key pair, provided that this information is conveniently available to the user. It is intended that seed s should be different for each generated key pair within each user. This will ensure that a different IV is used each time a different p and q is generated.

The first embodiment of the invention makes use of several functions for transforming input cryptographic variables to output cryptographic variables. Those skilled in the art will appreciate that the method of the invention does not hinge on the use of a particular function, although the invention describes possible methods for implementing these functions.

The four random numbers, $X_{p1}$, $X_{p2}$, $X_{q1}$, and $X_{q2}$, are generated from the inputs $W_p$, $W_q$, and IV via a method with the property that each bit of the output ($X_{p1}$, $X_{p2}$, $X_{q1}$, and $X_{q2}$) is a complex function of each bit of the input ($W_p$, $W_q$, and IV).

Those skilled in the art will recognize that there are many possible ways to generate the desired outputs from the inputs, and that the method of the invention does not hinge on the use of a particular method for generating the needed random numbers $X_{p1}$, $X_{p2}$, $X_{q1}$, and $X_{q2}$. One possible method would be to use a single function F that translates the inputs ($W_p$, $W_q$, and IV) into a single output containing $X_{p1}$, $X_{p2}$, $X_{q1}$, and $X_{q2}$. Another possible method would be to generate each random number separately with a different function, as follows:

$$F_1(W_p, W_q, IV) = X_{p1},$$

$$F_2(W_p, W_q, IV) = X_{p2},$$

$$F_3(W_p, W_q, IV) = X_{q1},$$

$$F_4(W_p, W_q, IV) = X_{q2}.$$

The length of $W_p$, $W_q$, and IV are 95, 95, and 66 bytes, respectively.

An example of the first method for computing the random numbers, $X_{p1}$, $X_{p2}$, $X_{q1}$, and $X_{q2}$, is shown in FIG. 1. The first method is described as follows: Let $p_0$ be a public prime of length L bits, such that L is greater than the length of the data to be generated, and let g be a public generator. An example of such a system is the Diffie-Hellman Encryption System well-known in the art (see A. Menezes, P. C. Van Oorschot, and S. Vanstone, Handbook of Applied Cryptography, CRC Press, 1997). For example, $p_0$ could be a 256-byte prime, which is sufficient to generate four 120-bit numbers. The random numbers $W_p$, $W_q$, and IV are concatenated to form a single 256-byte value $X = (W_p \| W_q \| IV)$ (101) and the 256-byte value Y is computed using the function $g^x$ mod $p_0$ (103) as follows:

$$Y = g^x \bmod p_0$$

where Y is defined as $Y = ( \ldots \| X_{p1}' \| X_{p2}' \| X_{q1}' \| X_{q2}' )$ (105)
and the length of each $X_p$ and $X_q$ value are defined as follows:

If e is odd, then the length of each respective X-value is 120 bits.

If e is even, then the length of each respective X-value is 118 bits.

The most significant bit in each of these four random numbers ($X_{p1}'$, $X_{p2}'$, $X_{q1}'$, and $X_{q2}'$) is fixed to "1" (107) and the resulting four values are the random numbers $X_{p1}$, $X_{p2}$, $X_{q1}$, and $X_{q2}$, (109) respectively.

Note that the four X-values are extracted from the least significant bits in the generated Y. Care must be taken to use bits in the generated Y that have no bias. Therefore, one would avoid using the most significant bit of Y, since it is biased to "0". Note also that the length of the four X-values is adjusted so that the method of the invention will work equally well regardless whether the public verification exponent e is odd or even. Making the X-values slightly smaller when e is even, ensures that the $Y_i$ values computed in the prime generation procedure will be of comparable size, since when e is even the $Y_i$ are computed via the recursive equation $Y_{i+1}=Y_i+8p_1p_2$ instead of the recursive equation $Y_{i+1}=Y_i+p_1p_2$, and so the $Y_i$ are 8 times larger.

The size of these random numbers $X_{p1}$, $X_{p2}$, $X_{q1}$, and $X_{q2}$ is fixed at 120 bits for odd e and at 118 bits for even e. ANSI Standard X9.31 permits the size of the random numbers to be fixed at 101 bits, or at 102 bits, or any value up to a maximum of 121 bits. In the invention, the size of the random numbers $X_{p1}$, $X_{p2}$, $X_{q1}$, and $X_{q2}$ is fixed at particular values in order to make the procedure unambiguous. Otherwise, one would have to carry along extra information to indicate the length of the generated random numbers $X_{p1}$, $X_{p2}$, $X_{q1}$, and $X_{q2}$, and this information would have to be provided in case of an audit.

Figure 2:
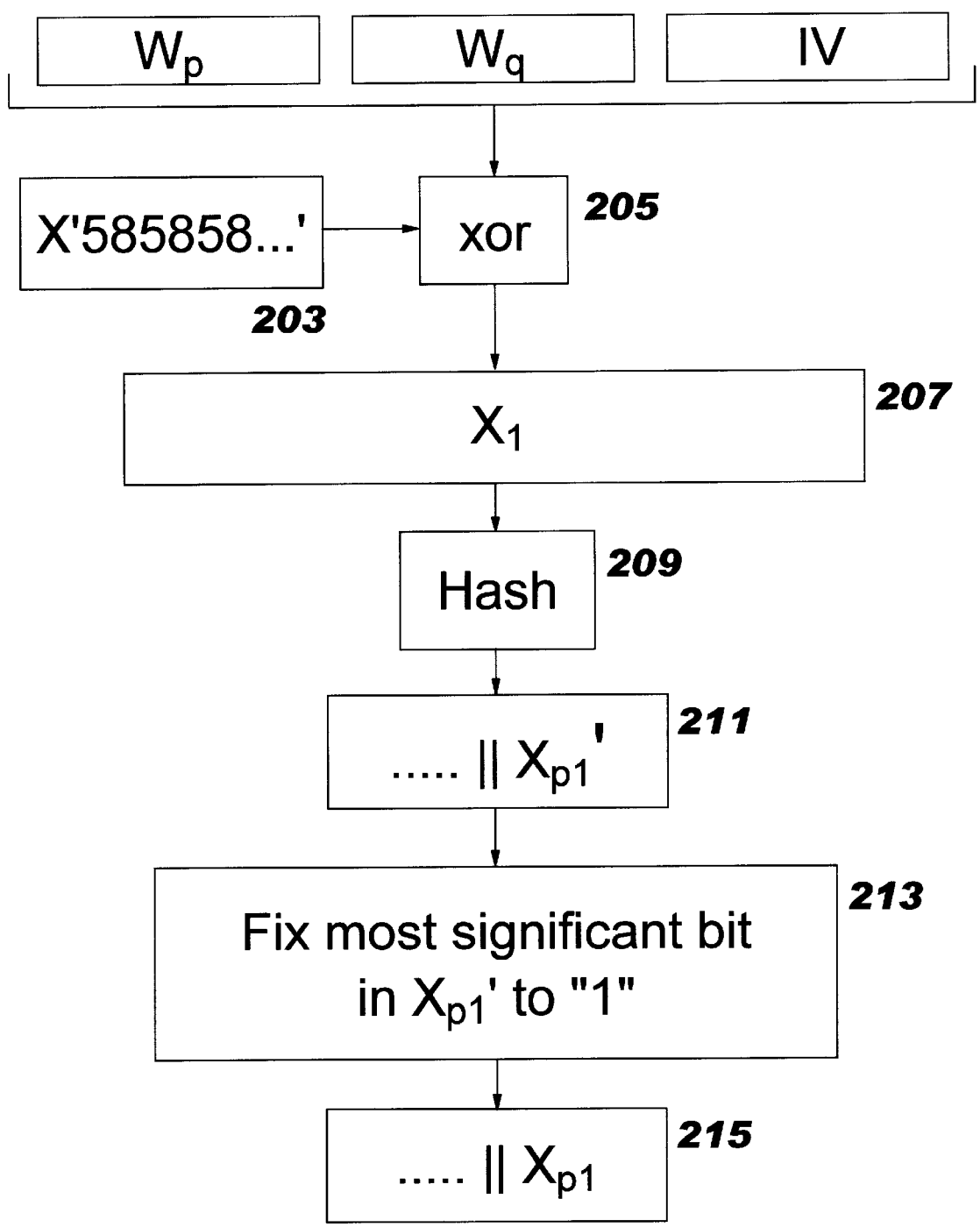
FIG. 2 illustrates an alternative method of computing random seeds.

FIG. 2 illustrates the computation of $X_{p1}$ using the second method. The second method is described as follows: Let $M_i$ (i=1, 2, 3, 4) denote four masking values of length L bits (203). The value L is set equal to the length of the concatenated values of $W_p$, $W_q$, and IV, respectively. In this case, L=2048. Now compute $X_i = (W_p \| W_q \| IV)$ xor $M_i$, (205) for i=1, 2, 3, 4. Those skilled in the art will recognize that there are many ways to define suitable masking values, and that one acceptable means for accomplishing this would be to define the $M_i$ as replicated patterns of hexadecimal digits, as follows:

$M_1$=X'58585858 . . . '
$M_2$=X'C6C6C6C6 . . . '
$M_3$=X'35353535 . . . '
$M_4$=X'EBEBEBEB . . . '

The four different masking values ensure that four different values of $Y_i$ are computed from the concatenated value $X=(W_p \| W_q \| IV)$, and that these computed hash values have no apparent relationship to each other. Each $X_i$ (207) is hashed with a hashing algorithm such as the SHA-1 hashing algorithm (209) to produce a 160-bit hash value $Y_i$, as follows:

$Y_i$=Hash($X_i$), (211)

for i=1, 2, 3, 4, where
$Y_1=( \ldots \| X_{p1}')$
$Y_2=( \ldots \| X_{p2}')$
$Y_3=( \ldots \| X_{q1}')$
$Y_4=( \ldots \| X_{q2}')$
and the length of each $X_p$ and $X_q$ value are defined as follows:
If e is odd, then the length of each respective X-value is 120 bits.
If e is even, then the length of each respective X-value is 118 bits.

The most significant bit in each of these four random numbers ($X_{p1}'$, $X_{p2}'$, $X_{q1}'$, and $X_{q2}'$) is fixed to "1" (213) and the resulting four values are the random numbers $X_{p1}$, $X_{p2}$, $X_{q1}$, and $X_{q2}$, (215) respectively.

Figure 3:
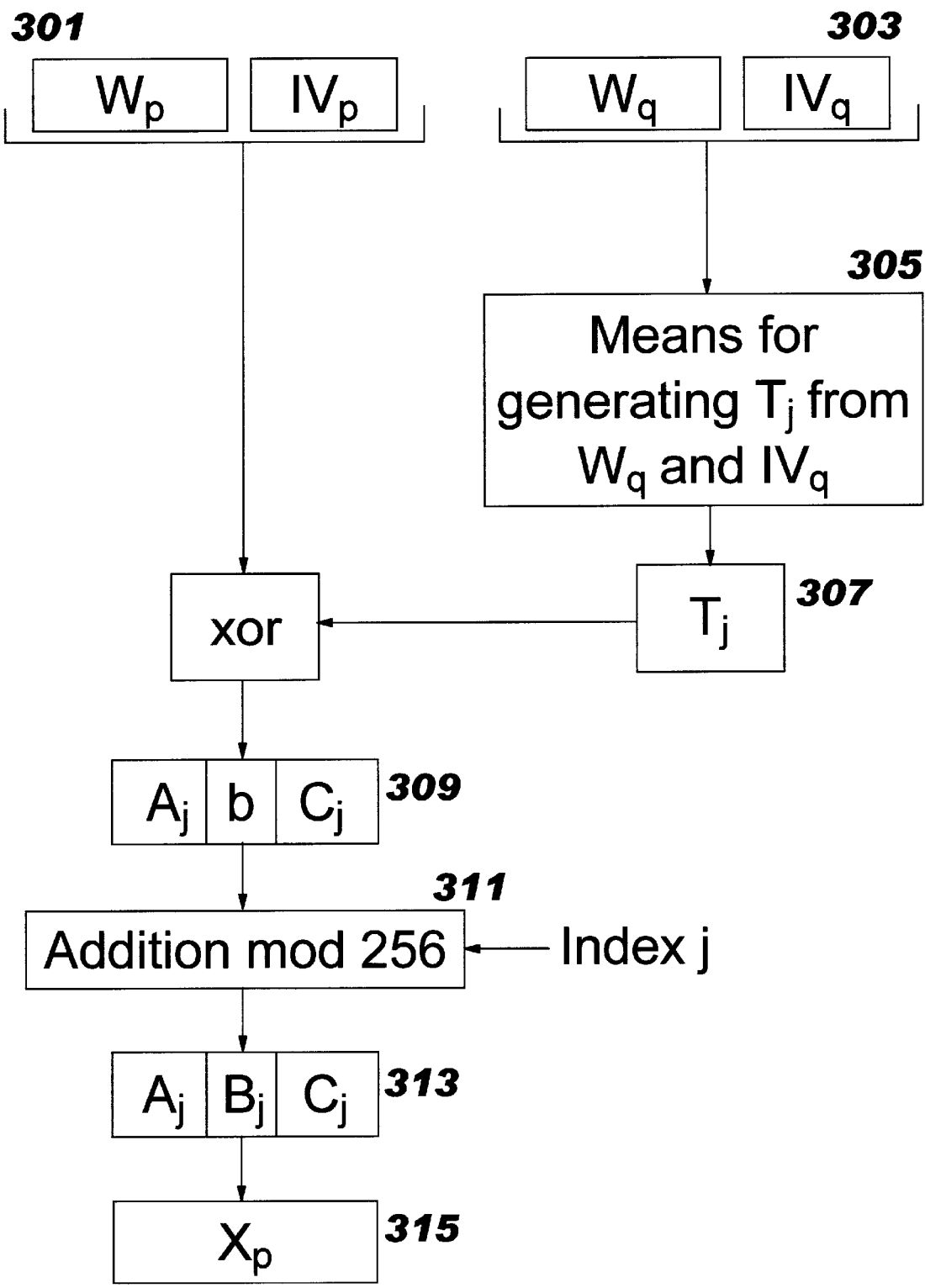
FIG. 3 depicts an exemplary method for generating $X_p$.

The random number $X_p$ is generated from the inputs $W_p$, $W_q$, $IV_p$ and $IV_q$, as shown in FIG. 3, where $IV_p$ is the most significant 33 bytes of IV and $IV_q$ is the least significant 33 bytes of IV.

$X_p$ is generated using the following procedural steps:
1. Concatenate $W_p$ and $IV_p$ to form the 128-byte value ($W_p \| IV_p$) (301). Concatenate $W_q$ and $IV_q$ to form the 128-byte value ($W_q \| IV_q$) (303).

2. Using steps (a) through (f) below, compute and test, in order, the values in the integer sequence $\{V_0, V_1, \ldots, V_{255}\}$, j is an integer $0 \leq j \leq 255$, until a value $V_j$ is found that satisfies the relationship $$(\sqrt{2})(2^{1023}) \leq V_j \leq (2^{1024}-1) \tag{1}$$

in which case $X_p$ is defined equal to $V_j$ and the modified prime number generation procedure continues, or until 256 values of $V_j$ have been computed and tested without finding a suitable $V_j$ satisfying Eq. (1), in which case the modified prime number generation procedure is aborted, whichever occurs first.

The integer sequence $\{V_0, V_1, \ldots, V_{255}\}$ is computed as follows:

(a) Compute $S_j=((W_q \| IV_q)+M_j)$ mod $2^{1024}$, where $M_j$ is the jth masking value in a set of 256 different 128-byte masking values $\{M_0, M_1, \ldots, M_{255}\}$.

(b) Transform the 128-byte input $S_j$ using function F to produce a 128-byte output $T_j'$. F is a function such that each bit in the output is a complex function of each bit in the input.

(c) Compute $T_j$ (307) from $T_j'$ as follows: For $j \geq 0$, $T_j$ is computed from $T_j'$ by replacing bytes 96–98 in $T_j'$ with bytes 96–98 in $T_0'$. Note that the bytes in $T_j$ and $T_j'$ are numbered 1, 2, . . . , 128 from the most significant byte to the least significant byte.

NOTE: If F approximates a random function, and has a uniform distribution over its range of possible values, then the probability that 200 values of $T_j$ are produced without producing a suitable $V_j$ is less than $2^{-100}$. The probability that an arbitrary $V_j$ in the integer sequence $\{V_0, V_1, \ldots, V_j\}$ fails the test of Eq. (1) is $((\sqrt{2}2)/2)$.

(d) Compute $U_j=(W_p \| IV_p)$ xor $T_j$, and then represent $U_j$ as the concatenation where $U_j=(A_j \| b \| C_j)$ (309) and the lengths of $A_j$, b, and $C_j$ are 95, 1, and 32 bytes, respectively. Note that b as well as the most significant 2 bytes of $C_j$ are fixed or constant for all $U_j$.

(e) Compute $B_j=(b+j)$ mod 256 (311).

(f) Concatenate $A_j$, $B_j$, and $C_j$ to form the 128-byte value $V_j=(A_j \| B_j \| C_j)$ (313).

(g) Set $X_p=V_j$.

A method for computing the function F is as follows: Let $p_0$ be a public prime of length L bits, where L is greater than the length of the output to be generated, and let g be a public generator. An example of such a system is the Diffie-Hellman Encryption System well-known in the art (see A. Menezes, P. C. Van Oorschot, and S. Vanstone, Handbook of Applied Cryptography, CRC Press, 1997.) For example, let $p_0$ be the first prime greater than $2^{1024}$. The intermediate value Q is computed from $S_j$, as follows:

$$Q = g^{S_j} \bmod p_0$$

In the unlikely event that the most significant bit of Q is "1", $S_j$ is set equal to Q and a new value of Q (denoted $Q_{new}$) is computed, as follows: $Q_{new}=g^Q$ mod $p_0$. If necessary, the process is repeated until a Q is produced whose most significant bit is "0," in which case $T_j$ is set equal to the least significant 1024 bits of Q.

The set of 256 masking values are constructed via a simple procedure that makes use of two tables of 16 different 4-byte elements each (see FIG. 4(A–C)). The index j ($0 \leq j \leq 255$) is first copied to a single 8-bit variable. The most significant 4 bits of that 8-bit variable are now used to index a 4-byte element in FIG. 4A (401) and the least significant 4 bits of that 8-bit variable are used to index a 4-byte element in FIG. 4B (402). These two 4-byte elements are concatenated to form a single 8-byte element, which is repeated 16 times to produce a 128-byte masking value. For example, a value of j=237 would be represented as B'1110 1101' in binary, and would therefore index the element X'2fef9593' in row 14 of FIG. 4A (401) and the element X'0d9a3469' in row 13 of FIG. 4B (402). These two elements are concatenated to form a single 8-byte element X'2fef95930d9a3469', and this 8-byte element is repeated 16 times to produce the masking value $M_{237}$.

Those skilled in the art will appreciate that there are many possible ways to generate the required masking values $M_0$ through $M_{255}$, and the method above is just one such method.

An alternative method for computing $T_j'$ from $(W_q \| IV_q)$ would be to employ a hashing algorithm, such as SHA-1. In this case, 7 tiled 20-byte SHA-1 hash outputs, or 7 SHA-1 hashing operations, are needed to produce a 128-byte value of $T_j'$. Thus, 7*256=1792 hashing operations and 1792 separate masking values would be needed to produce the full set of $T_j'$ values $\{T_0', T_1', \ldots, T_{255}'\}$.

The 7 masking values for a particular index value of j are constructed as follows: The index j ($0 \leq j \leq 255$) is first copied to a single 8-bit variable. The most Significant 4 bits of that 8-bit variable are now used to index a 4-byte element in FIG. 4A (401) of FIG. 4 and the least significant 4 bits of that 8-bit variable are used to index a 4-byte element in FIG. 4B (402). These two 4-byte elements are concatenated to form a single 8-byte element "m." The 1st masking value for index value j is constructed by concatenating the 8-byte element m and the 1st 8-byte element in FIG. 4C (403). The 2nd masking value for index value j is constructed by concatenating the 8-byte element m and the 2nd 8-byte element in FIG. 4C (403), and so forth. Each of these 16-byte pattern values are repeated 8 times to produce a 128-byte masking value for the index value j. The 7 masking values for the index value j are denoted $M_{j,1}, M_{j,2}, \ldots, M_{j,7}$. For example, the index value j=237 would therefore index the element X'2fef9593' in row 14 of FIG. 4A (401) and the element X'0d9a3469' in row 13 of FIG. 4B (402). These two elements are concatenated to form a single 8-byte element m=X'2fef95930d9a3469'. Masking value $M_{237,1}$ is constructed by concatenating the value m=X'2fef95930d9a3469' with the 1st 8-byte element, X'cbcb2178fc268442', in FIG. 4C (403), and then repeating this 16-byte value X'2fef95930d9a3469cbcb2178fc268442'8 times. The masking values $M_{237,2}$, $M_{237,3}$, etc. would be constructed similarly except the 2nd 8-byte element in FIG. 4C (403) would be used to construct masking value $M_{237,2}$, and the 3rd 8-byte element in FIG. 4C (403) would be used to construct masking value $M_{237,3}$, and so forth.

To compute $T_j'$ from $(W_q \| IV_q)$, the following 7 hash values $H_{j,1}, H_{j,2}, \ldots, H_{j,7}$ are computed with SHA-1:

$H_{j,1} = \text{Hash}(((W_q \| IV_q) + M_{j,1}) \mod 2^{1024})$
$H_{j,2} = \text{Hash}(((W_q \| IV_q) + M_{j,2}) \mod 2^{1024})$
$H_{j,3} = \text{Hash}(((W_q \| IV_q) + M_{j,3}) \mod 2^{1024})$
$H_{j,4} = \text{Hash}(((W_q \| IV_q) + M_{j,4}) \mod 2^{1024})$
$H_{j,5} = \text{Hash}(((W_q \| IV_q) + M_{j,5}) \mod 2^{1024})$
$H_{j,6} = \text{Hash}(((W_q \| IV_q) + M_{j,6}) \mod 2^{1024})$
$H_{j,7} = \text{Hash}(((W_q \| IV_q) + M_{j,7}) \mod 2^{1024})$ The 7 different masking values ensure that 7 different hash output values are computed from $(W_q \| IV_q)$, and that these computed hash values have no apparent relationship to each other.

The 7 hash values are tiled to form an intermediate value $H_j$, as follows:

$H_j = H_{j,1} \| H_{j,2} \| H_{j,3} \| H_{j,4} \| H_{j,5} \| H_{j,6} \| H_{j,7}$ and $T_j'$ is set equal to the least significant 128 bytes of the 140-byte value of $H_j$.

$T_j$ is computed from $T_j'$ using the method described above. That is, for $j \geq 0$, $T_j$ is computed from $T_j'$ by replacing bytes 96–98 in $T_j'$ with bytes 96–98 in $T_0'$.

Other hashing algorithms besides SHA-1 could be used to produce $H_j$, although this may require the use of a greater or lesser number of hashing operations and masking values in order to produce a tiled output of $\geq 128$ bytes. Additional masking values could be easily computed by adding more elements to FIG. 4C (403). Those skilled in the art will appreciate that the method of the invention could be modified to easily accommodate different hashing algorithms with hash outputs of different lengths.

In the prime number generation procedure of the present invention, the prime p must be generated prior to generating the random number $X_q$.

The prime p is generated from the values $X_p$, $p_1$, $p_2$, and e, in accordance with the procedure defined in ANSI Standard X9.31-1998 Digital Signatures Using Reversible public Key Cryptography For The Financial Services Industry (rDSA), except as noted below. $p_1$ and $p_2$ are the first primes greater than $X_{p1}$, and $X_{p2}$, respectively such that they are mutually prime with e, where e is the public verification exponent.

The procedure to generate the private prime factor p is a follows:

Compute the intermediate values:

1. $R_p = (p_2^{-1} \mod p_1) p_2 - (p_1^{-1} \mod p_2) p_1$. If $R_p < 0$, then replace $R_p$ by $R_p + p_1 p_2$.
2. $Y_0 = X_p + (R_p - X_p \mod p_1 p_2)$.

The above 2 conditions ensure that $Y_0$ is congruent to (1 mod $p_1$) and (−1 mod $p_2$), which in turn ensures that $p_1$ is a large prime factor of ($Y_0 - 1$) and $p_2$ is a large prime factor of ($Y_0 + 1$).

If e is odd, perform the following steps:

A. If $Y_0 < X_p$, replace $Y_0$ by $(Y_0 + p_1 p_2)$. Note that for odd e, the method of constructing $Y_0$ from $X_p$ and $p_1 p_2$ is such that $Y_0 - p_1 p_2 < X_p \leq Y_0$.

B. Search the integer sequence $\{Y_0, Y_1 = Y_0 + (p_1 p_2), Y_2 = Y_0 + 2(p_1 p_2), Y_3 = Y_0 + 3(p_1 p_2), \ldots, Y_i = Y_0 + i(p_1 p_2)\}$ in order, where i is an integer $\geq 0$, until finding a $Y_i$ such that
$Y_i$ is prime and
GCD ($Y_i - 1$, e)=1
where GCD is Greatest Common Divisor, in which case, $p = Y_i$, or until $2^{16} - 1 = 65,535$ values of $Y_i$ have been searched unsuccessfully, in which case the procedure halts and must be repeated using new values of $W_p$, $W_q$, and IV.

If e is even, perform the following steps:

A. Replace $Y_0$ with $Y_0 + k p_1 p_2$, where $0 \leq k \leq 7$ is the smallest non-negative integer that makes $Y_0 + k p_1 p_2 = 3 \mod 8$. If $Y_0 < X_p$, replace $Y_0$ by $(Y_0 + 8 p_1 p_2)$.

Note that for even e, the method of constructing $Y_0$ from $X_p$ and $p_1 p_2$ is such that $Y_0 - p_1 p_2 < X_p \leq Y_0$.

B. Search the integer sequence $\{Y_0, Y_1 = Y_0 + (8 p_1 p_2), Y_2 = Y_0 + 2(8 p_1 p_2), Y_3 = Y_0 + 3(8 p_1 p_2), \ldots, Y_i = Y_0 + i(8 p_1 p_2)\}$ in order, where i is an integer $\geq 0$, until finding a $Y_i$ such that $Y_i$ is prime and GCD $((Y_i-1)/2, e)=1$, and $Y_i=3 \mod 8$ in which case, $p=Y_i$, or until $2^{16}-1=65,535$ values of $Y_i$, denoted $\{Y_0, Y_1, \ldots, Y_{65534}\}$, have been searched unsuccessfully, in which case the procedure halts and must be repeated using new values of $W_p$, $W_q$, and IV.

Note that the present invention differs slightly from ANSI Standard X9.31 in that the present invention limits the number of $Y_i$ to be searched to $2^{16}-1=65,535$ values, whereas the ANSI Standard X9.31 imposes no such limit. However, the limit imposed by the invention is of no actual consequence, since the probability of such a failure is quite small. Note also that the method of the invention is designed so that at each step in the computation of the integer sequence $\{Y_0, Y_i, \ldots, Y_{65534}\}$, including the computation of $Y_0$, there can be at most a single "1" carry from the least significant 30 bytes of $Y_i$ to the next most significant 2 bytes of $Y_i$. In total, there can be at most 65,535 "1" carries from the least significant 30 bytes of $Y_i$ to the next most significant 2 bytes of $Y_i$, which will guarantee that—only on the basis of an inspection of the resulting value of p—one can always determine the exact number of "1" carries that occurred during the generation process. This fact is crucial to the proper operation of the validation procedure. is also worth noting that in the interval from $2^{1023}$ to $2^{1024}$, the probability that an integer is prime is about 1/710, and one would expect to search about 710 integers before finding a prime. Note that the search is in order, and therefore includes both odd and even integers. If we consider only the primarily test on $Y_i$ (i.e., ignore the GCD test on $Y_i$ using e), and if 49,179 $Y_i$ are tested for primarily, then the probability of not finding a prime in these 49,179 integer values is less than $2^{-100}$. More generally, if we let N represent the number of $Y_i$ that need to be searched in order to guarantee success with probability $>(1-2^{-100})$, then N=49,179 for the case where the $Y_i$ are tested for primarily only. If we take into account both tests, i.e., the primarily test and the GCD test using e, then the numbers for Prob(Yi is prime) and N are changed as follows: For e=2, Prob($Y_i$ is prime)=1/710 and N=49,179. For e=3, Prob($Y_i$ is prime)=2/1065 and N=73,786. For e=17, Prob($Y_i$ is prime)=1/755 and N=52,298. For e=$2^{16}$+1, Prob($Y_i$ is prime)=1/710, and N=49,179.

Figure 5:
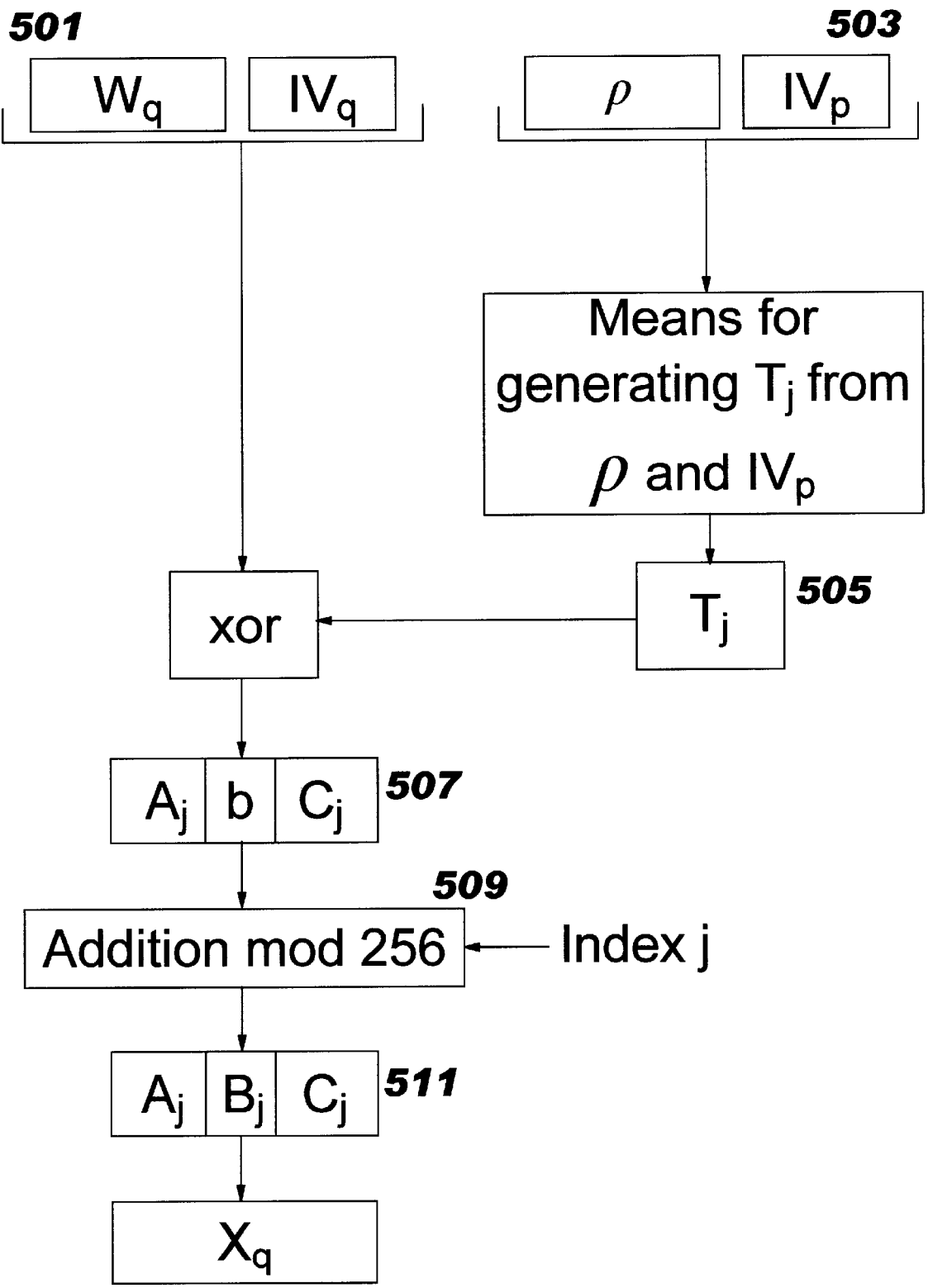
FIG. 5 is a pictorial representation of the generation of $X_q$.

The random number $X_q$ is generated from the inputs p, $W_q$, $IV_p$ and $IV_q$, as shown in FIG. 5, where $IV_p$ is the most significant 33 bytes of IV and $IV_q$ is the least significant 33 bytes of IV.

$X_q$ is generated using the following procedural steps:

1. Concatenate $W_q$ and $IV_q$ to form the 128-byte value $(W_q\|IV_q)$ (501). Concatenate the most significant 95 bytes of p with the Exclusive-OR product of the least significant 33 bytes of p and $IV_p$ (503). Call this value (left p∥right p xor $IV_p$) or (p xor $IV_p$) for short.

2. Using steps (a) through (f) below, compute and test, in order, the values in the integer sequence $\{V_0, V_1, \ldots, V_{255}\}$ until a value $V_j$ is found (j is an integer $0 \leq j \leq 255$) that satisfies the relationships expressed in Eqs. (2) and (3) below $$|X_p - V_j| > 2^{924} \quad (2)$$

$$(\sqrt{2})(2^{1023}) \leq V_j \leq (2^{1024}-1) \quad (3)$$

in which case $X_q$ is defined equal to $V_j$ and the modified prime number generation procedure continues, or until 256 values of $V_j$ have been computed and tested without finding a suitable $V_j$ satisfying Eqs. (2) and ($_3$), in which case the modified prime number generation procedure is aborted, whichever occurs first.

The integer sequence $\{V_0, V_1, \ldots, V_{255}\}$ is computed as follows:

(a) Compute $S_j=((p \text{ xor } IV_p)+M_j) \mod 2^{1024}$, where $M_j$ is the jth masking value in a set of 256 different 128-byte masking values $\{M_0, M_1, \ldots, M_{255}\}$.

(b) Transform the 128-byte input $S_j$ using function F to produce a 128-byte output $T_j'$. F is a function such that each bit in the output is a complex function of each bit in the input.

(c) Compute $T_j$ (505) from $T_j'$ as follows: For $j \geq 0$, $T_j$ is computed from $T_j'$ by replacing bytes 96–98 in $T_j'$ with bytes 96–98 in $T_0'$. Note that the bytes in $T_j$ and $T_j'$ are numbered 1, 2, ..., 128 from the most significant byte to the least significant byte.

NOTE: If F approximates a random function, and has a uniform distribution over its range of possible values, then the probability that 202 values of $T_j$ are produced without producing a suitable $V_j$ is less than $2^{-100}$. The probability that an arbitrary $V_j$ in the integer sequence $\{V_0, V_1, \ldots, V_j\}$ fails the tests of Eqs. (2) and ($_3$) is $((\sqrt{2})/2)+2^{-99}$.

(d) Compute $U_j=(W_p\|IV_p) \text{ xor } T_j$, and represent $U_j$ as a concatenation where $U_j=(A_j\|b\|C_j)$ (507) and the lengths of $A_j$, b, and $C_j$ are 95, 1, and 32 bytes, respectively. Note that b as well as the most significant 2 bytes of $C_j$ are fixed or constant for all $U_j$.

(e) Compute $B_j=(b+j) \mod 256$ (509).

(f) Concatenate $A_j$, $B_j$, and $C_j$ to form the 128-byte value $V_j=(A_j\|B_j\|C_j)$ (511).

(g) Set $X_q=V_j$.

A method for computing the function F is as follows: Let $p_0$ be a public prime of length L bits, where L is greater than the length of the output to be generated, and let g be a public generator. An example of such a system is the Diffie-Hellman Encryption System well-known in the art (see A. Menezes, P. C. Van Oorschot, and S. Vanstone, Handbook of Applied Cryptography, CRC Press, 1997.) For example, let $p_0$ be the first prime greater than $2^{1024}$. The intermediate value Q is computed from $S_j$, as follows:

$$Q = g^{S_j} \mod p_0$$

In the unlikely event that the most significant bit of Q is "1", $S_j$ is set equal to Q and a new value of Q (denoted $Q_{new}$) is computed, as follows: $Q_{new}=g^Q \mod p_0$. If necessary, the process is repeated until a Q is produced whose most significant bit is "0," in which case $T_j$ is set equal to the least significant 1024 bits of Q.

The set of 256 masking values are constructed via a simple procedure that makes use of two tables of 16 different 4-byte elements each (see FIG. 6). The procedure used here to generate the needed 256 masking values is the same as the procedure for generating the 256 masking values, described in the section Generation of the Random Number $X_p$ above, except that the masking values are constructed using the (different) 4-byte elements in FIG. 6A (601) and 6B (602) instead of the 4-byte elements in FIG. 4A (401) and 4B (402). This ensures that different masking values are used in the generation of $X_p$ and $X_q$. The reader is referred to the section Generation of the Random Number $X_p$ for a description of how to produce the needed masking values.

An alternative method for computing $T_j'$ from (p xor $IV_p$) would be to employ the SHA-1 hashing algorithm, as previously described in the section Generation of the Random Number $X_p$. In this case, 7 tiled 20-byte SHA-1 hash outputs, or 7 SHA-1 hashing operations, are needed to produce a 128-byte value of $T_j'$. Thus, 7*256=1792 hashing operations and 1792 separate masking values would be needed to produce the full set of $T_j'$ values $\{T_0', T_j', \ldots, T_{255}'\}$. The 7 masking values for a particular index value of j are constructed using the same procedure described in the section Generation of the Random Number $X_p$, except that the masking values are constructed using the (different) elements in Tables 6A (601), 6B (602), and 6C (603) instead of the elements in FIGS. 4A (401), 4B (402), and 4C (403). The reader is referred to the section Generation of the Random Number $X_p$ for a description of how to produce the needed masking values.

The prime q is generated from the values $X_q$, $q_1$, $q_2$, and e, in accordance with the procedure defined in ANSI Standard X9.31-1998 Digital Signatures Using Reversible public Key Cryptography For The Financial Services Industry (rDSA), except as noted below, where $q_1$ and $q_2$ are the first primes greater than $X_{q1}$, and $X_{q2}$ such that they are mutually exclusive with e, respectively, where e is the public verification exponent.

The procedure to generate the private prime factor q is a follows:

Compute the intermediate values:

1. $R_q = (q_2^{-1} \bmod q_1)q_2 - (q_1^{-1} \bmod q_2)q_1$. If $R_q < 0$, then replace $R_q$ by $R_q + q_1 q_2$.
2. $Y_0 = X_q + (R_q - X_q \bmod q_1 q_2)$.

The above 2 conditions ensure that $Y_0$ is congruent to ($_1$ mod $q_1$) and ($-1$ mod $q_2$), which in turn ensures that $q_1$ is a large prime factor of ($Y_0 - 1$) and $q_2$ is a large prime factor of ($Y_0 + 1$).

If e is odd, perform the following steps:

A. If $Y_0 < X_q$, replace $Y_0$ by $(Y_0 + q_1 q_2)$. Note that for odd e, the method of constructing $Y_0$ from $X_q$ and $q_1 q_2$ is such that $Y_0 - q_1 q_2 < X_q \leq Y_0$.

B. Search the integer sequence $$\{Y_0, Y_1 = Y_0 + (q_1 q_2), Y_2 = Y_0 + 2(q_1 q_2), Y_3 = Y_0 + 3(q_1 q_2), \ldots, Y_i = Y_0 + i(q_1 q_2)\}$$

in order, where i is an integer $\geq 0$, until finding a $Y_i$ such that
$Y_i$ is prime and
GCD $(Y_i - 1, e) = 1$
where GCD is Greatest Common Divisor, in which case, $q = Y_i$, or until $2^{16} - 1 = 65,535$ values of $Y_i$ have been searched unsuccessfully, in which case the procedure halts and must be repeated using new values of $W_p$, $W_q$, and IV.

If e is even, perform the following steps:

A. Replace $Y_0$ with $Y_0 + kq_1 q_2$, where $0 \leq k \leq 7$ is the smallest non-negative integer that makes $Y_0 + kq_1 q_2 = 7 \bmod 8$. If $Y_0 < X_q$, replace $Y_0$ by $(Y_0 + 8q_1 q_2)$. Note that for even e, the method of constructing $Y_0$ from $X_q$ and $q_1 q_2$ is such that $Y_0 - 8q_1 q_2 < X_q \leq Y_0$.

B. Search the integer sequence $$\{Y_0, Y_1 = Y_0 + (8q_1 q_2), Y_2 = Y_0 + 2(8q_1 q_2), Y_3 = Y_0 + 3(8q_1 q_2), \ldots, Y_i = Y_0 + i(8q_1 q_2)\}$$

in order, where i is an integer $\geq 0$, until finding a $Y_i$ such that
$Y_i$ is prime and
GCD $((Y_i - 1)/2, e) = 1$, and $Y_i = 7 \bmod 8$
in which case, $q = Y_i$, or until $2^{16} - 1 = 65,535$ values of $Y_i$, denoted $\{Y_0, Y_1, \ldots, Y_{65534}\}$, have been searched unsuccessfully, in which case the procedure halts and must be repeated using new values of $W_p$, $W_q$, and IV.

Note that the present invention differs slightly from ANSI Standard X9.31 in that the present invention limits the number of $Y_i$ to be searched to $2^{16} - 1 = 65,535$ values, whereas the ANSI Standard X9.31 imposes no such limit. However, the limit imposed by the invention is of no actual consequence, since the probability of such a failure is quite small.

Note also that the method of the invention is designed so that at each step in the computation of the integer sequence $\{Y_0, Y_1, \ldots, Y_{65534}\}$, including the computation of $Y_0$, there can be at most a single "1" carry from the least significant 30 bytes of $Y_i$ to the next most significant 2 bytes of $Y_i$. In total, there can be at most 65,535 "1" carries from the least significant 30 bytes of $Y_i$ to the next most significant 2 bytes of $Y_i$, which will guarantee that—only on the basis of an inspection of the resulting value of q—one can always determine the exact number of "1" carries that occurred during the generation process. This fact is crucial to the proper operation of the validation procedure.

It should also be noted that, in the interval from $2^{1023}$ to $2^{1024}$, the probability that an integer is prime is about 1/710, and one would expect to search about 710 integers before finding a prime. Note that the search is in order, and therefore includes both odd and even integers. If we consider only the primarily test on $Y_i$ (i.e., ignore the GCD test on $Y_i$ using e), and if 49,179 $Y_i$ are tested for primarily, then the probability of not finding a prime in these 49,179 integer values is less than $2^{-100}$. More generally, if we let N represent the number of $Y_i$ that need to be searched in order to guarantee success with probability $>(1-2^{-100})$, then N=49,179 for the case where the $Y_i$ are tested for primarily only. If we take into account both tests, i.e., the primarily test and the GCD test using e, then the numbers for Prob(Yi is prime) and N are changed as follows: For e=2, Prob($Y_i$ is prime)=1/710 and N=49,179. For e=3, Prob($Y_i$ is prime)= 2/1065 and N=73,786. For e=17, Prob($Y_i$ is prime)=1/755 and N=52,298. For e=$2^{16}$+1, Prob($Y_i$ is prime)=1/710, and N=49,179.

Note also that the test on $|p-q|$ is not part of the step of searching the $Y_i$ to find a prime, since if it ever happened that $|p-Y_i|<2^{294}$ for some $Y_i$ in the sequence, then it might also be the case the $|p-Y_i|<2^{294}$ for all subsequent $Y_i$ in the sequence, in which case the procedure would continue with no possible chance of finding a suitable $Y_i$.

The private signature exponent d is calculated from e, p and q as follows:

If e is odd, then $d = e^{-1} \bmod(\text{LCM } (p-1, q-1))$.
If e is even, then $d = e^{-1} \bmod(\frac{1}{2} \text{LCM } (p-1, q-1))$.
where LCM denotes Least Common Multiple. The generated value of d is now checked to ensure that it satisfies the following condition:

$$d > 2^{1024}$$

in which case, the procedure for generating d completes successfully. Otherwise, if the test on d fails, then the procedure halts, and it must be repeated using new values of $W_p$ and $W_q$.

NOTE: The present invention differs slightly from ANSI Standard X9.31 with regard to the action taken in the event that the test on d fails. The present invention calls for the generation procedure to be repeated using new values of $W_p$ and $W_q$, whereas ANSI Standard X9.31 calls for the generation procedure to be repeated using new values for $X_q$, $X_{q1}$, and $X_{q2}$. However, this difference is of no real consequence, since the probability of failure is so small that, for practical purposes, the test on d will never fail.

The inputs to the prime number validation procedure are as follows:

- public modulus n, where n=pq.
- public verification exponent e.
- private signature exponent d.
- a specification designating which prime is p (e.g., specifying whether p<q or p>q).

The prime number validation procedure consists of the following:

- A sub-procedure for recovering p and q from n and d.
- A sub-procedure for recovering the initial values $W_p$ and $W_q$ from the recovered values of p and q and the initialization value IV.
- A sub-procedure for generating primes p' and q' from $W_p$, $W_q$ and IV and verifying that the generated primes, p' and q', are equal to the recovered primes, p and q.
- A sub-procedure for generating the private signature exponent d' from e, p' and q' and verifying that the generated value of d' is equal to the input value of d.

A convenient and straightforward method, well-known in the art, exists to recover the primes p and q from n and d, using a procedure described in Section 8.2.2 of A. J. Menezes' *Handbook of Applied Cryptography*, CRC Press, New York, 1997.

One can also recover the initial values Wp and Wq from the primes p and q and the initialization value (IV) using a procedure described by the present invention. Once $W_p$ and $W_q$ have been recovered, the Generation Procedure is again performed to generate candidate values of p' and q'. If the generated primes are equal in value to the recovered primes, then the validation procedure succeeds, and one can say that the recovered primes were generated in accordance with the prescribed Generation Procedure; otherwise, the validation procedure fails.

If it is unknown which of the two recovered primes is p or q, one may elect to make an arbitrary assignment. If the prime number validation procedure reports success, then stop. Otherwise, interchange the values of p and q and repeat the prime number validation procedure. In this case, the primes are valid if the prime number validation procedure reports success on either the first or second attempt, whereas the primes are not valid if the prime number validation procedure reports failure on both attempts. Depending on how one wishes to implement the invention, the primes can also be considered to be not valid if the prime number validation procedure reports success on both attempts. Even though such an event is extremely unlikely, one could avoid the situation by performing validation as part of generation, in which case one would accept the generated primes only if the validation procedure reports success when p and q are correctly assigned.

The prime number validation procedure consists of the following procedural steps:

1. Recover p and q from n, d and e, using the procedure in Section 8.2.2 of A. J. Menezes' *Handbook of Applied Cryptography*, CRC Press, New York, 1972.
2. Verify that the two recovered primes are 128-byte integers. If yes, then continue; otherwise abort with failure.
3. Use the input specification to determine which of the recovered primes is p and which is q.
4. Divide q into four fields, as follows:

$$q=A'\|B'\|C\|$$

where the length in bytes of A', B', and C are 95, 1, and 2, respectively. The least significant 30 bytes of q are not named.

5. Compute the 128-byte value of $T_0$ from the 128-byte recovered value of p and the 33-byte input $IV_p$ using the procedure described above in the section Generation of Random Number $X_q$. Divide To into four fields, as follows:

$$T_0=a\|b\|c\|$$

where the length in bytes of a, b, and c are 95, 1, and 2, respectively. The least significant 30 bytes of $T_0$ are not named.

6. Compute (A∥B) from (A'∥B'), as follows:
   If C≧c, then set (A∥B)=(A'∥B').
   If C<c, then set (A∥B)=(A'∥B')−1.
   NOTE: The condition (C≧c) indicates that a "1" carry from byte 97 to byte 96 did not occur during the generation of q, whereas the condition (c<C) indicates that a "1" carry from byte 97 to byte 96 did occur during the generation of q.

7. Compute index j, as follows:

$$j=(B-b+255) \bmod 256.$$

8. Compute the 128-byte value of $T_j$ from the 128-byte recovered value of p, the 33-byte input $IV_p$, and the recovered index j (step 7) using the procedure described above in the section Generation of Random Number $X_q$.

9. Compute $W_q$=A xor (most significant 95 bytes of $T_j$).

10. Divide p into four fields, as follows:

$$p=A'\|B'\|C\|$$

where the length in bytes of A', B', and C are 95, 1, and 2, respectively. The least significant 30 bytes of p are not named.

11. Compute the 128-byte value of $T_0$ from the 95-byte input $W_q$ and the 33-byte input $IV_q$ using the procedure described above in the section Generation of Random Number $X_p$, see also FIG. 3. Divide $T_0$ into four fields, as follows:

$$T_0=a\|b\|c\|$$

where the length in bytes of a, b, and c are 95, 1, and 2, respectively. The least significant 30 bytes of $T_0$ are not named. Note that the $T_0$ values in steps 5 and 11 of the validation procedure are not the same; they are computed from different input values.

12. Compute (A∥B) from (A'∥B'), as follows:
    If C≧c, then set (A∥B)=(A'∥B').
    If C<c, then set (A∥B)=(A'∥B')−1.
    NOTE: The condition (C≧c) indicates that a "1" carry from byte 97 to byte 96 did not occur during the generation of p, whereas the condition (C<c) indicates that a "1" carry from byte 97 to byte 96 did occur during the generation of p.

13. Compute index j, as follows:

$$j=(B-b+255) \bmod 256.$$

14. Compute the 128-byte value of $T_j$ from the $_{95}$-byte input $W_q$, the $_{33}$-byte input $IV_q$ and the recovered index j (step 13) using the procedure described above in the section Generation of Random Number $X_p$, see also FIG. 3.

15. Compute $W_p$=A xor (most significant 95 bytes of $T_j$). Note that the value of A from step 12 is the value used in step 15.

16. Now, repeat the modified prime number generation procedure using the values of $W_p$ and $W_q$, recovered above in steps 12 and 7, respectively, and the input value of IV to generate two primes (p' and q') and to generate a private signature exponent d', including all tests performed on the generated values. If the modified prime number generation procedure succeeds in generating two primes and a private signature exponent from $W_p$, $W_q$, and IV, and the generated primes (p' and q') are equal to the recovered primes (p and q), from step 1 above, and the generate private signature exponent d' is equal to the input private signature exponent d, then return success. Otherwise, return failure.

A second embodiment of the invention differs from the first embodiment of the invention only in the way the variable $B_j$ is computed. The procedure for computing $B_j$ is described above, see also FIG. 3 and FIG. 5. In the first embodiment, $B_j$ contains an encoded index value (j), whereas in the second embodiment $B_j$ contains a bit-pattern used for scanning or searching. In either case, $B_j$ is used as the means to determine the correct value of $T_j$ needed to recover $W_p$ from p, or similarly to determine the correct value of $T_j$ needed to recover $W_q$ from q. However, the method for determining the correct value of $T_j$ is different.

In the second embodiment, the step of computing $T_j$ from $T_j'$, wherein bytes 96–98 in $T_j'$ are replaced with bytes 96–98 in $T_0'$, is changed so that only bytes 97–98 in $T_j'$ are replaced with bytes 97–98 in $T_0'$. Thus, the value b (byte 96) in the first embodiment of the invention, which is fixed or constant, is replaced in the second embodiment of the invention by a sequence of pseudorandomly generated integer values, $b_0$, $b_1$, ..., $b_j$.

The method of computing $B_j$ from $b_j$ is as follows:

If $b_j/b_i$ for i=0, 1, ..., j−1, then $B_j$=$b_j$.

Otherwise, $B_j$=($b_j$+k)mod 256, where k is the least positive integer value≦255 such that $b_k$/bi for i=0, 1, ..., j.

In the present circumstance where $B_j$ and $b_j$ are 8-bit values, we are assured of the fact that 256 different values of $B_j$ will be produced from 256 pseudorandomly generated values of $b_j$, even though some of the $b_j$ may repeat. An example illustrating the output integer sequence $B_0$, $B_1$, $B_2$, ..., computed from the input integer sequence $b_0$, $b_1$, $b_2$, ..., is the following:

$b_j$: 1, 95,1, 254, 254, 0, 254, ...

$B_j$: 1, 95, 2, 254, 255, 0, 3, ...

In the example, the repeated values 1, 254 and 254 map to the values 2, 255, and 3, respectively, since these are the nearest neighbors according to the specified mapping rule.

The validation procedure in the second embodiment is the same as the validation procedure in the first embodiment, except that the value of $T_j$ needed to perform the recovery step is determined not by recovering the index j from B but instead by using a forward searching procedure in which the values of $T_0$, $T_1$, $T_2$, etc. are generated, in order, until a $T_j$ is found such that the corresponding value of $b_j$ produces a mapped value $B_j$ equal to the value B obtained at step 6 or step 12 in the validation procedure, depending on whether the method is being used to recover $W_q$ from q, or to recover $W_p$ from p, respectively.

A third embodiment of the invention avoids the need to compute the integer sequence $T_0$, $T_1$, $T_2$, etc., by making use of a "squeeze" function F.

Let "Lowlimit" be the smallest integer greater than ($\sqrt{2}$)($2^{1023}$) and let x∥y=Lowlimit, where the length in bytes of x and y are 96 and 32, respectively. Let F1 denote a "squeeze" function that maps integer values in the range 0 to ($2^{768}$−1) to integer values in the range x to ($2^{768}$−1). Let F2 denote a "squeeze" function that maps integer values in the range 0 to ($2^{256}$−1) to integer values in the range y to ($2^{256}$−1).

The procedures for generating $X_p$ and $X_q$ are modified, as described below.

$X_p$ is generated using the following procedural steps:

1. Concatenate $W_p$ and $IV_p$ to form the 128-byte value ($W_p$∥$IV_p$). Concatenate $W_q$ and $IV_q$ to form the 128-byte value ($W_q$∥$IV_q$).
2. Compute $S_0$=(($W_q$∥$IV_q$)+$M_0$)mod $2^{1024}$, where $M_0$ is the zeroth masking value, as described above in the first embodiment of the invention in the section "Generation of Random Number $X_p$."
3. Transform the 128-byte input $S_0$ using function F to produce a 128-byte output $T_0'$, also equal to the output $T_0$, as described above in the first embodiment of the invention in the section "Generation of Random Number $X_p$." F is a function such that each bit in the output is a complex function of each bit in the input.
4. Compute $U_0$=($W_p$∥$IV_p$) xor $T_0$ and $U_0$ is represented as a concatenation where $U_0$=(A∥B∥C) and the lengths of A, B, and C are 95, 1, and 32 bytes, respectively.
5. Compute F1 (A∥B), where x≦F1(A∥B)≦($2^{768}$−1), using the "squeeze" function F1.
6. If F1(A∥B)=x, then compute F2(C), where y≦F2(C)≦($2^{256}$−1), and set $X_p$=F1(A∥B)∥F2(C). Otherwise, if F1(A∥B)>x, then set $X_p$=F1(A∥B)∥C. The method of constructing $X_p$ is such that it is guaranteed to satisfy the relationship $$(\sqrt{2})(2^{1023}) \leq X_p \leq (2^{1024}-1)$$

The values x and y are those defined above, i.e., x∥y=Lowlimit, where Lowlimit is the smallest integer greater than ($\sqrt{2}$)($2^{1023}$) And the length in bytes of x and y are 96 and 32, respectively.

The procedure for generating $X_q$ is similar to the procedure for generating $X_p$. $X_q$ is generated using the following procedural steps:

1. Concatenate $W_q$ and $IV_q$ to form the 128-byte value ($W_q$∥$IV_q$). Concatenate the most significant 95 bytes of p with the Exclusive-OR product of the least significant 33 bytes of p and $IV_p$. Call this value (left p∥right p xor $IV_p$). or (p xor $IV_p$) for short.
2. Compute $S_0$=((p xor $IV_p$)+$M_0$)mod $2^{1024}$, where $M_0$ is the zeroth masking value, as described above in the first embodiment of the invention in the section "Generation of Random Number $X_q$."
3. Transform the 128-byte input $S_0$ using function F to produce a 128-byte output $T_0'$, also equal to the output $T_0$, as described above in the first embodiment of the invention in the section "Generation of Random Number $X_q$." F is a function such that each bit in the output is a complex function of each bit in the input.
4. Compute $U_0$=($W_q$∥$IV_q$) xor $T_0$, where $U_0$=(A∥B∥C) and the lengths of A, B, and C are 95, 1, and 32 bytes, respectively.
5. Compute F1(A∥B), where x≦F1(A∥B)≦($2^{768}$−1), using the "squeeze" function F1.

6. If $F1(A\|B)=x$, then compute $F2(C)$, where $y \leq F2(C) \leq (2^{256}-1)$, and set $X_q=F1(A\|B)\|F2(C)$. Otherwise, if $F1(A\|B)>x$, then set $X_q=F1(A\|B)\|C$. The method of constructing $X_q$ is such that it is guaranteed to satisfy the relationship $$(\sqrt{2})(2^{1023}) \leq X_q \leq (2^{1024}-1)$$

The values x and y are those defined above, i.e., $x\|y=$ Lowlimit, where Lowlimit is the smallest integer greater than $(\sqrt{2})(2^{1023})$ and the length in bytes of x and y are 96 and 32, respectively.

7. Test the generated value of $X_q$ against the generated value of $X_p$ to ensure that these values satisfy the following relationship $$|X_p-X_q|>2^{924}$$

in which case $X_p$ and $X_q$ are accepted and the modified prime number generation procedure continues. Otherwise, in the unlikely event that $X_p$ and $X_q$ do not satisfy this relationship, the modified prime number generation procedure is aborted, and must be repeated.

In the third embodiment of the invention, the procedure for recovering $W_q$ from q is accomplished by using steps 1 through 6 of the prime number validation procedure, described in the first embodiment of the invention, and then replacing steps 7 through 9 with the following steps:

a. Compute the set of 4 input values v1, v2, v3, and v4 that map to the value (A\|B) computed in step 6 of the validation procedure, described above in the first embodiment of the invention, by inverting the squeeze function F1. A procedure for accomplishing this is described below b. Determine which of the input values v1, v2, v3, and v4 is the correct input value. This can be learned by comparing the value b computed in step 5 of the validation procedure with the least significant byte of each of the 4 values, v1, v2, v3, and v3. Only one of these 4 consecutive values can have a least significant byte equal to b. If such a v is found, then $W_q$ is set equal to the most significant 95 bytes of that value of v and the procedure continues. Otherwise, if no such value of v is found, the procedure returns failure and the procedure halts. The procedure for generating p and q from $X_p$ and $X_q$ are identical to that used in the previous embodiment.

In the third embodiment of the invention, the procedure for recovering $W_p$ from p is accomplished by using steps 10 through 12 of the prime number validation procedure, described in the first embodiment of the invention, and then replacing steps 13 through 15 with the following steps:

a. Compute the set of 4 input values v1, v2, v3, and v4 that map to the value (A\|B) computed in step 12 of the validation procedure, described above in the first embodiment of the invention, by inverting the squeeze function F1. A procedure for accomplishing this is described below b. Determine which of the input values v1, v2, v3, and v4 is the correct input value. This can be learned by comparing the value b computed in step 11 of the validation procedure with the least significant byte of each of the 4 values, v1, v2, v3, and v3. Only one of these 4 consecutive values can have a least significant byte equal to b. If such a v is found, then $W_p$ is set equal to the most significant 95 bytes of that value of v and the procedure continues. Otherwise, if no such value of v is found, the procedure returns failure and the procedure halts.

The squeeze functions F1 and F2 can be implemented using straightforward mathematical computations.

Recall that $x\|y=$Lowlimit, where Lowlimit is the smallest integer greater than $(\sqrt{2})(2^{1023})$ and the length in bytes of x and y are 96 and 32, respectively. F1 is a "squeeze" function that maps integer values in the range 0 to $(2^{768}-1)$ to integer values in the range x to $(2^{768}-1)$. F2 is a "squeeze" function that maps integer values in the range 0 to $(2^{256}-1)$ to integer values in the range y to $(2^{256}-1)$. The values y and x are given by the following expressions:

$$x=(\text{Lowlimit}-(\text{Lowlimit mod } 2^{256}))/2^{256}$$

$$y=\text{Lowlimit mod } 2^{256}$$

The linear function G that maps an element n in the interval [a, b] into an interval [c, d] is given by the following equation:

$$G(n)=u*n+v$$

where $u=(((d+1)-c)/(b-a)$
$v=(b*c-a*(d+1))/(b-a)$ and if $G(n)<d+1$, then $G(n)$ is rounded down to the nearest integer, otherwise if $G(n)=d+1$, then $G(n)$ is decremented by 1.

The squeeze function F1, which is a particular instance of the general squeeze function G, is computed using the following values for a, b, c, and d:

$a=0$
$b=(2^{768}-1)$
$c=(\text{Lowlimit}-(\text{Lowlimit mod } 2^{256}))/2^{256}$
$d=(2^{768}-1)$ The squeeze function F2, which is another particular instance of the general squeeze function G, is computed using the following values for a, b, c, and d:

$a=0$
$b=(2^{256}-1)$
$c=\text{Lowlimit mod } 2^{256}$
$d=(2^{256}-1)$

For any number m in the interval (c, d), except m=d, the inverse of m is the set of all integers $\{n\}$ in the interval (a, b) such that $$m \leq G(n) < m+1$$

or such that $$(m-v)/u \leq n < (m+1-v)/u$$

For the special case, m=d, the inverse of m is the set of all integers $\{n\}$ in the interval (a, b) such that $$m \leq G(n) \leq m+1$$

or such that $$(m-v)/u \leq n \leq (m+1-v)/u$$

The values $(m-v)/u$ and $(m+1-v)/u$ are easily computed using the provided equations for u and v, and the integer values a, b, c and d corresponding to the respective desired intervals (a, b) and (c, d).

The fourth embodiment of the invention is a variation on the 1st and 2nd embodiments of the invention. In the fourth embodiment of the invention, the lengths of the parameters are changed so that a "1" carry from $C_j$ to $B_j$ (see FIG. 3) is not allowed. Hence, in the recovery step, one can immediately decode $B_j$ to find j, and then compute $T_j$ and recover $W_p$ from $A_j$. The same holds true for the recovery of $W_q$.

In a fourth embodiment, $W_p$ and $W_q$ are each 80 bytes, and $IV_p$ and $IV_q$ are each 48 bytes. The length in bytes $A_j$, b (as well as $B_j$), and $C_j$, shown in FIG. 3, are 80, 1, and 47, respectively. Thus, in the fourth embodiment, the length of $A_j$ is decreased and the length of $C_j$ is increased. Otherwise, the steps of producing $X_p$ and $X_q$ are the same as those in the first or second embodiments. However, the step of generating p from $X_p$ and the step of generating q from $X_q$ is modified as follows: After generating p from $X_p$, an additional step is performed to ensure that the most significant 80 bytes of p are equal to the most significant 80 bytes of $X_p$. If these bytes are equal, then p is accepted. If these bytes are unequal, then p is rejected and the procedure is repeated with new starting values. Likewise, after generating q from $X_q$, an additional step is performed to ensure that the most significant 80 bytes of q are equal to the most significant 80 bytes of $X_q$. If these bytes are equal, then q is accepted. If these bytes are unequal, then q is rejected and the procedure is repeated with new starting values. However, it is unlikely that the described tests will fail, since in the worst case there can be only a single "1" carry from the least significant 32 bytes of $C_j$ to the most significant 15 bytes of $C_j$ and therefore there could be a single "1" carry from the most significant 15 bytes of $C_j$ to ($A_j$, $B_j$) only in the unlikely event that the most significant 15 bytes of $C_j$ were all ones. The probability of such an event is $2^{-120}$. The reader will appreciate that the length of the parameter values need not be specifically those given here, but rather they could be adjusted so as to yield some desired probability of a "1" carry from $C_j$ to($A_j$, $B_j$).

The reader will also appreciate that since the generation steps ensure that no carry propagates from $C_j$ to ($A_j$, $B_j$), the step of determining whether to subtract 1 from ($A_j$, $B_j$), as required in the 1st and 2nd embodiments, is eliminated. However, the price paid for this is that the lengths of $W_p$ and $W_q$ must be reduced. Consequently, there is less secret entropy used in the generation of the primes.

A fifth embodiment of the invention is also a variation on the 1st and 2nd embodiments of the invention. The fifth embodiment of the invention omits the steps that ensure the generated primes are strong primes. That is, the procedure omits the steps that ensure p−1 contains a large prime factor $p_1$ and that p+1 contains a large prime factor $p_2$. Likewise, the procedure omits the steps that ensure q−1 contains a large prime factor $q_1$ and that q+1 contains a large prime factor $q_2$. In the fifth embodiment of the invention, the steps of generating $X_p$ and $X_q$ and the steps of generating p from $X_p$ and q from $X_q$ are modified.

The procedures for generating $X_p$ and $X_q$ are the same as that described for the first embodiment except for the step of computing $T_j$ from $T_j'$, which is modified as follows: For $j \geq 0$, $T_j$ is computed from $T_j'$ by replacing bytes 96–128 in $T_j'$ with bytes 96–128 in $T_0'$. Note that the bytes in $T_j$ and $T_j'$ are numbered 1, 2, . . . , 128 from the most significant byte to the least significant byte.

When e is odd, the following steps are performed to generate p from $X_p$:

A. Set $Y_0=X_p$.
B. Search the integer sequence $$\{Y_0, Y_1=Y_0+1, Y_2=Y_0+2, Y_3=Y_0+3, \ldots, Y_i=Y_0+i\}$$

in order, where i is an integer$\geq 0$, until finding a $Y_i$ such that
$Y_i$ is prime and
GCD ($Y_i-1$, e)=1
where GCD is Greatest Common Divisor, in which case, p=$Y_i$, or until $2^{16}-1=65,535$ values of $Y_i$ have been searched unsuccessfully, in which case the procedure halts and must be repeated using new values of $W_p$, $W_q$, and IV.

When e is odd, the steps for generating q from $X_q$ are the same as those for generating p from $X_p$.

When e is even, the following steps are used to generate p from $X_p$:

A. Set $Y_0=X_p$.
B. Replace $Y_0$ with $Y_0+k$, where $0 \leq k \leq 7$ is the smallest non-negative integer that makes $Y_0+k=3$ mod 8. If $Y_0<X_p$, replace $Y_0$ by ($Y_0+8$).
C. Search the integer sequence $$\{Y_0, Y_1=Y_0+1*8, Y_2=Y_0+2*8, Y_3=Y_0+3*8, \ldots, Y_i=Y_0+i*8\}$$

in order, where i is an integer$\geq 0$, until finding a $Y_i$ such that
$Y_i$ is prime and
GCD (($Y_i-1$)/2, e)=1, and $Y_i=3$ mod 8
where GCD is Greatest Common Divisor, in which case, p=$Y_i$, or until $2^{16}-1=65,535$ values of $Y_i$ have been searched unsuccessfully, in which case the procedure halts and must be repeated using new values of $W_p$, $W_q$, and IV.

When e is even, the following steps are used to generate q from $X_q$:

A. Set $Y_0=X_p$.
B. Replace $Y_0$ with $Y_0+k$, where $0 \leq k \leq 7$ is the smallest non-negative integer that makes $Y_0+k=7$ mod 8. If $Y_0<X_p$, replace $Y_0$ by ($Y_0+8$).
C. Search the integer sequence $$\{Y_0, Y_1=Y_0+1*8, Y_2=Y_0+2*8, Y_3=Y_0+3*8, \ldots, Y_i=Y_0+i*8\}$$

in order, where i is an integer$\geq 0$, until finding a $Y_i$ such that
$Y_i$ is prime and
GCD (($Y_i-1$)/2, e)=1, and $Y_i=7$ mod 8
where GCD is Greatest Common Divisor, in which case, p=$Y_i$, or until $2^{16}-1=65,535$ values of $Y_i$ have been searched unsuccessfully, in which case the procedure halts and must be repeated using new values of $W_p$, $W_q$, and IV.

The procedure for validating p and q can be described as follows:

1. Recover p and q from n, d, and e, as described in the first embodiment.
2. Verify that the two recovered primes are 128-bytes integers. If yes, then continue; otherwise abort with failure.
3. Use the input specification to determine which of the recovered primes is p and which is q, as described in the first embodiment.
4. Divide q into four fields, as follows:

$q=A'\|B'\|C'\|D$ where the length of A', B', C', and D are 95 bytes, 1 byte, 237 bits, and 19 bits, respectively.
5. Compute the 128-byte value of $T_0$ from the 128-byte recovered value of p and the 33-byte input $IV_p$ using the procedure described above, see also FIG. 5. Divide $T_0$ into four fields, as follows:

$$T_0=a\|b\|c\|d$$

where the length of a, b, c, and d are 95 bytes, 1 byte, 237 bits, and 19 bits, respectively.

6. Compute (A‖B‖C) from (A'‖B'‖C'), as follows:
   If D≧d, then set (A‖B‖C)=(A'‖B'‖C').
   If D<d, then set (A‖B‖C)=(A'‖B'‖C')−1.

NOTE: The condition (D≧d) indicates that a "1" carry from the least significant 19 bits did not occur during the generation of q, whereas the condition (D<d) indicates that a "1" carry from the least significant 19 bits did occur during the generation of q.

7. Compute index j, as follows:

$$j=(B-b+255) \bmod 256.$$

8. Compute the 128-byte value of $T_j$ from the 128-byte recovered value of p, the 33-byte input $IV_p$, and the recovered index j (step 7) using the modified procedure described above for the fifth embodiment of the invention.

9. Compute $W_q$=A xor (most significant 95 bytes of $T_j$).

10. Divide p into four fields, as follows:

$$q=A'\|B'\|C'\|D$$

where the length of A', B', C', and D are 95 bytes, 1 byte, 237 bits, and 19 bits, respectively.

11. Compute the 128-byte value of $T_0$ from the 95-byte input $W_q$ and the 33-byte input $IV_q$ using the procedure described previously, see also FIG. 3. Divide $T_0$ into four fields, as follows:

$$T_0=a\|b\|c\|d$$

where the length of a, b, c, and d are 95 bytes, 1 byte, 237 bits, and 19 bits, respectively.

12. Compute (A‖B‖C) from (A'‖B'‖C'), as follows:
    If D≧d, then set (A‖B‖C)=(A'‖B'‖C').
    If D≧d, then set (A‖B‖C)=(A'‖B'‖C')−1.

NOTE: The condition (D≧d) indicates that a "1" carry from the least significant 19 bits did not occur during the generation of p, whereas the condition (D<d) indicates that a "1" carry from the least significant 19 bits did occur during the generation of p.

13. Compute index j, as follows:

$$j=(B-b+255) \bmod 256.$$

14. Compute the 128-byte value of $T_j$ from the 95-byte input $W_q$, the 33-byte input $IV_q$ and the recovered index j (step 13) using the modified procedure described above for the fifth embodiment of the invention.

15. Compute $W_p$=A xor (most significant 95 bytes of $T_j$). Note that the value of A from step 12 is the value used in step 15.

16. Now, repeat the modified prime number generation procedure using the values of $W_p$ and $W_q$, recovered above in steps 12 and 7, respectively, and the input value of IV to generate two primes (p' and q') and to generate a private signature exponent d', including all tests performed on the generated values. If the modified prime number generation procedure succeeds in generating two primes and a private signature exponent from $W_p$, $W_q$, and IV, and the generated primes (p' and q') are equal to the recovered primes (p and q), from step 1 above, and the generate private signature exponent d' is equal to the input private signature exponent d, then return success. Otherwise, return failure.

As should be obvious to one skilled in the art, a similar method can be used to generate any numbers from $X_p$ and $X_q$, not necessarily the prime pairs that have the above-mentioned properties. The creation of the numbers will start with a seed or seeds that would be recoverable from these numbers. The examples could be the numbers that fall within a specific range or the elliptic curve parameters a and b, created from seeds, as described in ANSI Standard X9.62-1998, The Elliptic Curve Digital Signature Algorithm (ECDSA).

What is claimed is:

1. A computer system for creating a user-generated prime number with encoded seed value information, said system comprising:
   a generation algorithm having inputs, said inputs consisting of one or more secret seed numbers and one or more additional numbers;
   a forward computational step for generating a prime number from said one or more secret seed numbers and said one or more additional numbers; and,
   a backward computational step for deriving said one or more secret seed numbers from said prime number and said one or more additional numbers such that said one or more secret seed numbers cannot be computed directly from said prime number.

2. A method for creating a user-generated prime number with encoded seed value information, said method comprising the steps of:
   generating a prime number from one or more secret seed numbers and one or more additional numbers; and,
   deriving said one or more seed numbers from said prime number and said one or more additional numbers using a backward computational step such that said one or more secret seed numbers cannot be computed directly from said prime number.

3. A computer system for creating one or more user-generated prime numbers with encoded seed value information for use in public key cryptography, said system comprising:
   a generation algorithm having inputs, said inputs consisting of one or more secret seed numbers and one or more additional numbers;
   a first computational step for generating a first prime number from one or more of said secret seed numbers and one or more of said additional numbers using a forward computation; and,
   second computational step for generating a second prime number from one or more of said secret seed numbers, said first prime number, and zero or more of said additional numbers using a forward computation such that said secret seed numbers are recoverable.

4. A system as claimed in claim 3 also comprising a third computational step for deriving said one or more seed numbers from said prime numbers and said one or more additional numbers using a backward computational step such that said one or more secret seed numbers and said one or more additional numbers cannot be computed directly from said prime numbers.

5. A method for creating one or more user-generated prime numbers with encoded seed value information for use in public key cryptography, from one or more secret seed numbers and one or more additional numbers, said method comprising the steps of:

generating a first prime number from one or more secret seed numbers and one or more additional numbers using a forward computation; and, generating a second prime number from one or more secret seed numbers, said first prime number, and zero or more of said additional numbers using a forward computation such that said secret seed numbers are recoverable.

6. A method as claimed in claim 5 comprising the additional step of deriving said seed number from said prime numbers and said one or more additional numbers using a backward computational step such that said secret seed number and said one or more additional numbers cannot be computed directly from said prime numbers.

7. A method for generating self-validating prime numbers for use in cryptography from secret random numbers and zero or more initialization values such that said secret random numbers are encoded into said self-validating prime number for auditing purposes, said method comprising:

selecting said secret random numbers;

generating additional random numbers from said secret random numbers and said zero or more initialization values;

assigning chosen primes from said additional random numbers using forward computation; and, discarding said secret random numbers;

wherein, for purposes of auditing, said secret random numbers can be computed using an inverse computation from said chosen primes and said initialization value.

8. A method as claimed in claim 2, 5 or 7 also utilizing an initialization value in conjunction with said secret random numbers.

9. A method as claimed in claim 8 where said initialization value is generated using a public key algorithm.

10. A computer system for generating prime numbers which can be audited to verify that said prime numbers have been generated in accordance with a prescribed generation algorithm, said system comprising:

said prescribed generation algorithm for generating a prime number from a seed value and an initialization value such that it is computationally infeasible to derive said seed value or said initialization value from said prime number; and, a recovery algorithm for deriving said seed value from said initialization value and said prime number.

11. A computer system as claimed in claim 10 wherein said seed value is a secret seed.

12. A computer system as claimed in claim 10 wherein said initialization value is composed of a public part and a secret part.

13. A computer system for generating prime numbers which can be audited to verify that said prime numbers have been generated in accordance with a prescribed generation algorithm, said system comprising:

a first programmatic step of deriving a seed number from an input number and a first prime number utilizing a recovery algorithm such that it is computationally infeasible to derive said seed number or said input number from said first prime number;

a second programmatic step of generating a verification prime number from said seed number and said input number utilizing said prescribed generation algorithm; and, comparing said first and said verification prime numbers and concluding that said first prime number has been generated in accordance with said prescribed generation algorithm only if said first and said verification prime numbers are equal.

14. A method for generating prime numbers which can be audited to verify that said prime numbers have been generated in accordance with a prescribed generation algorithm, said method comprising the steps of:

generating a prime number from a seed value and an initialization value using said prescribed generation algorithm such that it is computationally infeasible to derive said seed value or said initialization value from said prime number; and, deriving said seed value from said initialization value and said prime number using a recovery algorithm.

15. A method as claimed in claim 14 wherein said seed value is a secret seed.

16. A method as claimed in claim 14 wherein said initialization value is composed of a public part and a secret part.

17. A method for generating prime numbers which can be audited to verify that said prime numbers have been generated in accordance with a prescribed generation algorithm, said method comprising the steps of:

deriving a seed number from an input number and a first prime number utilizing a recovery algorithm such that it is computationally infeasible to derive said seed number or said input number from said first prime number;

generating a verification prime number from said seed number and said input number utilizing said prescribed generation algorithm; and, comparing said first and said verification prime numbers and concluding that said first prime number has been generated in accordance with said prescribed generation algorithm only if said first and said verification prime numbers are equal.

18. A computer system for creating a user-generated number with encoded seed value information, said system comprising:

a generation algorithm having inputs, said inputs consisting of one or more secret seed numbers and one or more additional numbers;

a forward computational step for generating said user-generated number from said one or more secret seed numbers and said one or more additional numbers; and, a backward computational step for deriving said one or more secret seed numbers from said user-generated number and said one or more additional numbers such that said one or more secret seed numbers cannot be computed directly from said user-generated number.

19. A method for creating a user-generated number with encoded seed value information, said method comprising the steps of:

generating a user-generated number from one or more secret seed numbers and one or more additional numbers; and, deriving said one or more seed numbers from said user-generated number and said one or more additional numbers using a backward computational step such that said one or more secret seed numbers cannot be computed directly from said user-generated number.

20. A method for generating self-validating numbers for use in cryptography from secret random numbers and zero or more initialization values such that said secret random numbers are encoded into said self-validating number for auditing purposes, said method comprising:

selecting said secret random numbers;

generating additional random numbers from said secret random numbers and said zero or more initialization values;

assigning chosen numbers from said additional random numbers using forward computation; and, discarding said secret random numbers;

wherein, for purposes of auditing , said secret random numbers can be computed using an inverse computation from said chosen numbers and said zero or more initialization values.

21. A computer system for generating auditable numbers which can be audited to verify that said auditable numbers have been generated in accordance with a prescribed generation algorithm, said system comprising:

said prescribed generation algorithm for generating an auditable number from a seed value and an initialization value such that it is computationally infeasible to derive said seed value or said initialization value from said auditable number; and, recovery algorithm for deriving said seed value from said initialization value and said auditable number.

22. A computer system as claimed in claim 21 wherein said initialization value is composed of a public part and a secret part.

23. A method for generating auditable numbers which can be audited to verify that said auditable numbers have been generated in accordance with a prescribed generation algorithm, said method comprising the steps of:

generating an auditable number from a seed value and an initialization value using said prescribed generation algorithm such that it is computationally infeasible to derive said seed value or said initialization value from said auditable number; and, deriving said seed value from said initialization value and said auditable number using a recovery algorithm.

* * * * *